US007158983B2

(12) United States Patent
Willse et al.

(10) Patent No.: US 7,158,983 B2
(45) Date of Patent: Jan. 2, 2007

(54) TEXT ANALYSIS TECHNIQUE

(75) Inventors: Alan R. Willse, Richland, WA (US); Elizabeth G. Hetzler, Herndon, VA (US); Lawrence L. Hope, Surry, ME (US); Theodore E. Tanasse, West Richland, WA (US); Susan L. Havre, Richland, WA (US); Alan E. Turner, Herndon, VA (US); Margaret MacGregor, deceased, late of Dublin, OH (US); by Catherine Naucarrow, legal representative, Piedmont, CA (US); Grant C. Nakamura, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 392 days.

(21) Appl. No.: 10/252,984

(22) Filed: Sep. 23, 2002

(65) Prior Publication Data
US 2004/0059736 A1 Mar. 25, 2004

(51) Int. Cl.
*G06F 17/00* (2006.01)
(52) U.S. Cl. ...................... 707/101; 707/102
(58) Field of Classification Search .............. 707/1–10, 707/100–104.1
See application file for complete search history.

(56) References Cited

U.S. PATENT DOCUMENTS

| | | | |
|---|---|---|---|
| 4,839,853 A | 6/1989 | Deerwester et al. | |
| 4,991,087 A | 2/1991 | Burkowski et al. | |
| 5,317,507 A | 5/1994 | Gallant | |
| 5,325,298 A | 6/1994 | Gallant | |
| 5,384,703 A | 1/1995 | Withgott et al. | |
| 5,442,778 A | 8/1995 | Pedersen et al. | |
| 5,541,836 A | 7/1996 | Church et al. | |
| 5,619,709 A | 4/1997 | Caid et al. | |
| 5,640,553 A | 6/1997 | Schultz | |
| 5,659,766 A * | 8/1997 | Saund et al. | 704/9 |
| 5,675,819 A | 10/1997 | Schuetze | |
| 5,687,364 A | 11/1997 | Saund et al. | |
| 5,742,816 A | 4/1998 | Barr et al. | |
| 5,754,938 A * | 5/1998 | Herz et al. | 725/116 |
| 5,794,178 A | 8/1998 | Caid et al. | |
| 5,819,258 A * | 10/1998 | Vaithyanathan et al. | 707/2 |
| 5,835,893 A | 11/1998 | Ushioda | |
| 5,864,846 A | 1/1999 | Voorhees et al. | |

(Continued)

FOREIGN PATENT DOCUMENTS

WO      WO 00/10100      2/2000

(Continued)

OTHER PUBLICATIONS

Adam Schenker, Mark Last, Abraham Kandel, "*Design and Implementation of a Web Mining System for Organizing Search Engine Results*", University of Florida and Ben-Gurion University of the Negev, date unknown.

(Continued)

*Primary Examiner*—Joon Hwan Hwang
(74) *Attorney, Agent, or Firm*—Woodard, Emhardt, Moriarty, McNett & Henry LLP

(57) ABSTRACT

One embodiment of the present invention includes means determining a concept representation for a set of text documents based on partial order analysis and modifying this representation if it is determined to be unidentifiable. Furthermore, the embodiment includes means for labeling the representation, mapping documents to it to provide a corresponding document representation, generating a number of document signatures each of a different type, and performing several data processing applications each with a different one of the document signatures of differing types.

22 Claims, 13 Drawing Sheets

U.S. PATENT DOCUMENTS

| | | | |
|---|---|---|---|
| 5,864,855 | A | 1/1999 | Ruocco et al. |
| 5,873,056 | A | 2/1999 | Liddy et al. |
| 5,873,076 | A | 2/1999 | Barr et al. |
| 5,986,673 | A | 11/1999 | Martz |
| 6,021,215 | A | 2/2000 | Kornblit et al. |
| 6,078,917 | A | 6/2000 | Paulsen, Jr. et al. |
| 6,092,065 | A | 7/2000 | Floratos et al. |
| 6,115,708 | A * | 9/2000 | Fayyad et al. .................. 707/6 |
| 6,216,134 | B1 | 4/2001 | Heckerman et al. |
| 6,233,575 | B1 | 5/2001 | Agrawal et al. |
| 6,263,335 | B1 | 7/2001 | Paik et al. |
| 6,263,337 | B1 | 7/2001 | Fayyad et al. |
| 6,289,354 | B1 | 9/2001 | Aggarwal et al. |
| 6,298,174 | B1 * | 10/2001 | Lantrip et al. .............. 382/305 |
| 6,314,399 | B1 | 11/2001 | Deligne et al. |
| 6,338,060 | B1 | 1/2002 | Washizawa |
| 6,345,265 | B1 | 2/2002 | Thiesson et al. |
| 2001/0049678 | A1 | 12/2001 | Yaginuma |

FOREIGN PATENT DOCUMENTS

WO  WO 01/31586 A1  5/2001

OTHER PUBLICATIONS

Wray Buntine and Henry Titti, "*Multi-faceted Learning for Web Taxonomies*", Helsinki Inst. Of Information Technology, date unknown.

Thomas Hofmann and Jan Puzicha, "*Unsupervised Learning from Dyadic Data*", International Computer Science Institute, Dec. 1998.

Nancy E. Heckman, Ruben H. Zamar, "*Comparing the shapes of regression functions*", The University of British Columbia, Dated as early as 2000.

*Hierarchical Classes: Model and Data Analysis*, DeBoeck, Rosenberg, Psychometriak—vol. 53, No. 3; 361-381 (Sep. 1988).

*On-Line New Event Detection and Tracking*, Allan, Papka, Lavrenko, Center for Intelligent Information Retrieval Computer Science Department, 1998.

*Clumping Properties of Content-Bearing Words*, Bookstein, Klein, Raita, 1998.

*UMASS Approaches to Detection and Tracking at TDT2*, Pap;ka, Allan, Lavrenko, Center for Intelligent Information Retrieval Computer Science Department, 1998.

*Refining Initial Points for K-Means Clustering*, Bradley, Rayyad, 1998.

*Initialization of Iterative Refinement Clustering Algorithms*, Rayyad, Reina, Bradley, Microsoft Research Technical Report MSR-TR-09-38, Jun. 1998.

*Deriving Concept Hierarchies from Text*, Sanderson, Croft, 1999.

*Learning Approaches for Detecting and Tracking News Events*, Yang, Carbonell, Brown, Pierce, Archibald, Liu, 1999.

*Bump Hunting for Risk: A New Data Mining Tool and its Applications*, Becker, Fahrmeir, Department of Statistics, University of Munich, 1999.

*Concept Decompositions for Large Sparse Text Data using Clustering*, Dhillon, Modha, IBM Research Center, 2000.

*Dimensional Anchors: A Graphic Primitive for Multidimensional Multivariate Information Visualizations*, Hoffman, Grinstein, Pinkney, institute for Visualization and Perception Research, 2000.

*TimeMines: Constructing Timelines and Statistical Models of Word Usage*, Swan, Jansen, Department of Computer Science (Feb. 2001).

* cited by examiner

|    | b1 | b2 | b3 | b4 |
|----|----|----|----|----|
| t1 | 1  | 1  | 1  | 1  |
| t2 | 1  | 1  | 0  | 1  |
| t3 | 0  | 1  | 1  | 1  |
| t4 | 1  | 0  | 0  | 1  |
| t5 | 0  | 0  | 1  | 1  |
| t6 | 0  | 1  | 0  | 0  |

*Fig. 5*

TEXT ANALYSIS TECHNIQUE

BACKGROUND

The present invention relates to data processing and more particularly, but not exclusively, relates to text analysis techniques.

Recent technological advancements have led to the collection of a vast amount of electronic data. These collections are sometimes arranged into corpora each comprised of millions of text documents. Unfortunately, the ability to quickly identify patterns or relationships which exist within such collections, and/or the ability to readily perceive underlying concepts within documents of a give corpus remain highly limited. Common text analysis applications include information retrieval, document clustering, and document classification (or document filtering). Typically, such operations are preceded by feature extraction, document representation, and signature creation, in which the textual data is transformed to numeric data in a form suitable for analysis. In some text analysis systems, the feature extraction, document representation, and signature creation are the same for all applications. The Battelle SPIRE system provides an example in which each document is represented by a numeric vector called the SPIRE 'signature'; all SPIRE applications then work directly with this signature vector.

In other text analysis systems (e.g., IBM's Intelligent Miner for Text), approaches for feature extraction, document representation or signature creation vary with the application. Desired features often differ for document clustering and document classification applications. In classification, a 'training' set of documents with known class labels is used to 'learn' rules for classifying future documents; features can be extracted that show large variation or differences between known classes. In clustering, documents are organized into groups with no prior knowledge of class labels; features can be extracted that show large variation or clumping between documents; however, because 'true' class labels are unknown, they cannot be exploited for feature extraction.

While generic systems facilitate the layering of multiple applications once a generic 'signature' is obtained, it may not perform as well in specific applications as systems that were developed specifically for that application. In contrast, the disadvantage of specialized systems is that they require separate development of feature extraction, document representation, or signature creation algorithms for each application, which can be time consuming, and impractical for small research groups.

Furthermore, current schemes tend to group documents according to a unitary measure of semantic similarity; however, documents can be similar in different 'respects'. For example, in an assessment of retrieval of aviation safety incident reports related to documents describing the Cali accident (M. W. McGreevy and I. C. Statler, NASA/TM-1998-208749), analysts judged incident reports as related or not to the Cali accident (based on NTSB investigative reports of the Cali accident) according to six different 'respects' exemplified by the questions asked of the analysis: (1) in some ways, the context of this incident is similar to the context of the Cali accident; (2) some of the events of this incident are similar to some of the events of the Cali accident; (3) some of the problems of this incident are similar to some of the problems of the Cali accident; (4) some of the human factors of this incident are similar to some of the human factors of the Cali accident; (5) some of the causes of this incident are similar to some of the causes of the Cali accident; and (6) in some ways, this incident is relevant to the Cali accident. Many existing systems do not account for these different dimensions of similarity.

Moreover, typical systems do not account for the confidence in observed relationships, the potential for multiple levels of meaning, and/or the context of observed relationships. Thus, there is an ongoing need for further contributions in this area of technology.

SUMMARY

One embodiment of the present invention is a unique data processing technique. Other embodiments include unique apparatus, systems, and methods for analyzing collections of text documents or records.

A further embodiment of the present invention is a method that includes selecting a set of text documents; selecting a number of terms included in the set; establishing a multidimensional document space with a computer system as a function of these terms; performing a bump-hunting procedure with the computer system to identify a number of document space features that each correspond to a composition of two or more concepts of the documents; and deconvolving these features with the computer system to separately identify the concepts.

Still a further embodiment of the present invention is a method that includes extracting terminological features from a set of text documents; establishing a representation of a number of concepts of the text documents as a function of the features; and identifying a number of different related groups of the concepts. The representation may correspond to an arrangement of several levels to indicate different degrees of concept specificity.

Yet another embodiment of the present invention includes a method comprising: extracting terminological features from a set of text documents; establishing a representation of a number of concepts of the text documents as a function of these features; determining the representation is non-identifiable; and in response, constraining one or more processing parameters of the routine to provide a modified concept representation. In one form, the representation hierarchically indicates different degrees of specificity among related members of the concepts and corresponds to an acyclic graph organization.

Still a further embodiment relates to a method which includes: extracting terminological features from a set of text documents; establishing a representation of a number of concepts of the documents as a function of these features; evaluating a selected document relative to the representation; and generating a number of document signatures for the selected document with the representation.

In another embodiment of the present invention, a method comprises: selecting a set of text documents; representing the documents with a number of terms; identifying a number of multiterm features of the text documents as a function of frequency of each of the terms in each of the documents; relating the multiterm features and terms with one or more data structures corresponding to a sparse matrix; and performing a latent variable analysis to determine a number of concepts of the text documents from the one or more data structures. This method may further include providing a concept representation corresponding to a multilevel acyclic graph organization in which each node of the graph corresponds to one of the concepts.

Yet another embodiment of the present invention includes a method for performing a routine with a computer system that includes: determining a number of multiterm features of a set of text documents as a function of a number of terms included in those documents; identifying one of a number of first level concepts of the text documents based on one or more terms associated with one of the features; establishing one of several second level concepts of the documents by identifying one of the terms found in each member of a subset of the one of the first level concepts; and providing a concept representation of the documents based on the first level and second level concepts.

A further embodiment involves a method that comprises: identifying a number of events; providing a visualization of the events with a computer system; and dimensioning each of a number of visualization objects relative to a first axis and a second axis. The visualization objects each represent a different one of the events and are positioned along the first axis to indicate timing of each of the events relative to one another with a corresponding initiation time and a corresponding termination time of each of the events being represented by an initiation point and a termination point of each of the objects along the first axis. The extent of each object along the second axis is indicative of relative strength of the event represented thereby.

In another embodiment of the present invention, a method includes: providing a set of text documents; evaluating time variation of a number of terms included in these documents; generating a number of clusters corresponding to the documents with a computer system as a function of these terms; and identifying a number of events as a function of a time variation of the clusters.

For a further embodiment of the present invention, a method includes: providing a number of textual documents arranged relative to a period of time; identifying a feature with a time varying distribution among the documents; evaluating presence of this feature for each of several different segments of the time period; and detecting an event as a function of the one of the segments with a frequency of the feature greater than other of the segments and a quantity of the documents corresponding to the feature.

Still another embodiment includes a method, comprising: selecting a set of text documents; designating several different dimensions of the documents; characterizing each of the dimensions with a corresponding set of words; performing a cluster analysis of the documents based on the set of words for each of the dimensions; and visualizing the clustering analysis for each of the dimensions.

Yet another embodiment is directed to a method which includes: providing a list of words with a computer system as a function of a number of context vectors for a set of text documents and one or more words; receiving input responsive to this list; reweighting a number of different entries corresponding to the context vectors with the computer system based on this input; providing an output of related words with a computer system based on the reweighting; and repeating receipt of the input, reweighting, and provision of the output with a computer system as desired.

In other embodiments, a unique system is provided to perform one or more of the above-indicated methods and/or at least one device is provided carrying logic executable by a computer system to perform one or more of the above-indicated methods.

Accordingly, one object of the present invention is to provide a unique data processing technique.

Another object is to provide a unique apparatus, system, device, or method for analyzing textual data.

Further objects, embodiments, forms, features, aspects, benefits, and advantages of the present invention will become apparent from the drawings and detailed description contained herein.

BRIEF DESCRIPTION OF THE VIEWS OF THE DRAWING

FIG. 5 is an illustration of a term-by-bump matrix.

DETAILED DESCRIPTION OF SELECTED EMBODIMENTS

Figure 1:
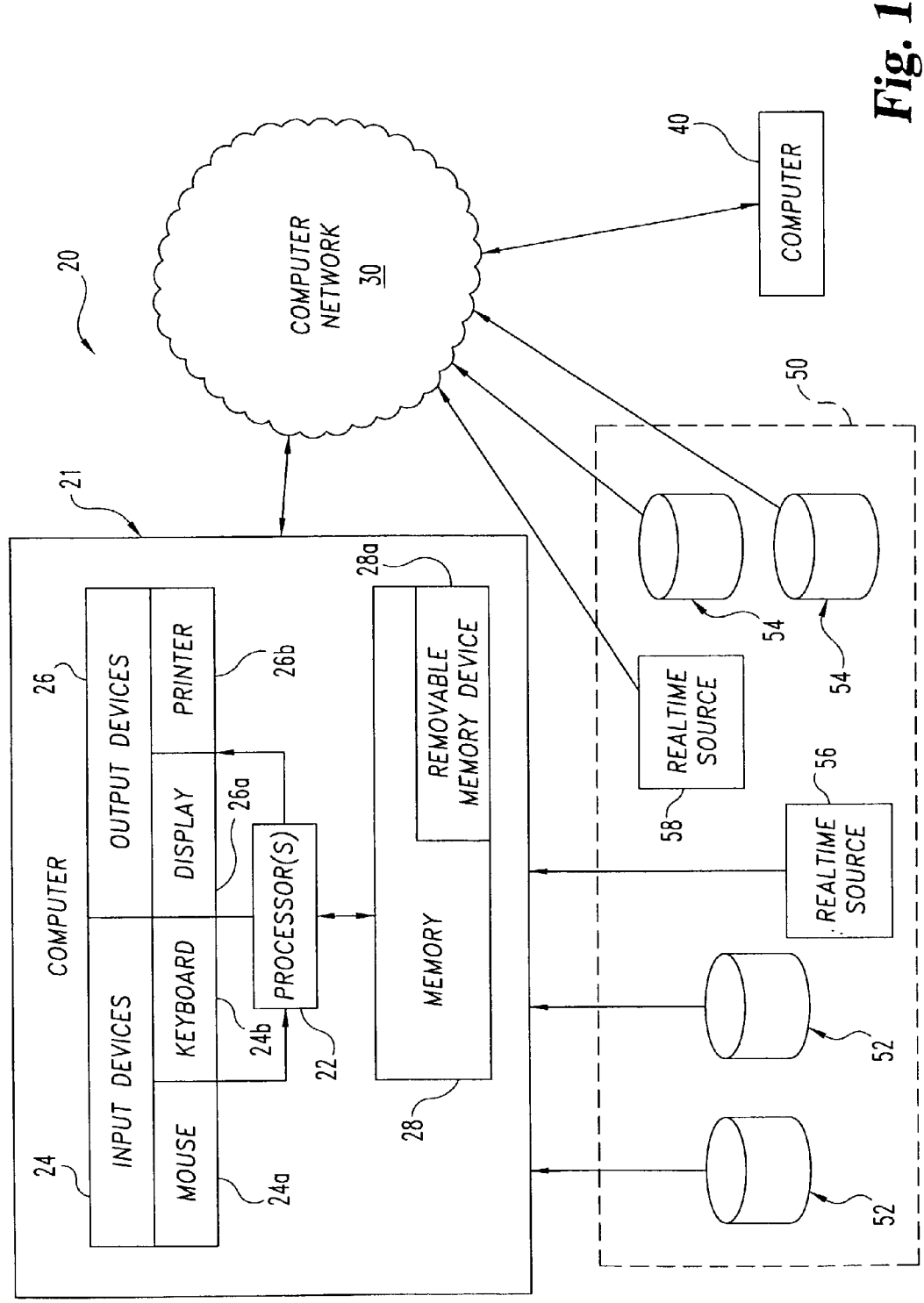
FIG. 1 is a diagrammatic view of a computing system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In accordance with one embodiment of the present invention, text analysis is performed to create a hierarchical, multifaceted document representation that enables multiple distinct views of a corpus based on the discovery that it can be desirable to consider similarity of documents in different 'respects'. The hierarchical feature provides the potential for multiple levels of meaning to be represented; where the desired 'level of meaning' to use in a given application often depends on the user and the level of confidence for the different representation levels. For example, in one document there might be a relatively high degree of confidence that the topic "Sports" is discussed, but confidence might be low regarding the type of sport; in another document confidence might be high that the sport of tennis is discussed. In one form, this concept representation is created automatically, using machine learning techniques. It can be created in the absence of any 'outside' knowledge, using statistically derived techniques. Alternatively or additionally, outside knowledge sources can be used, such as predefined document categorizations and term taxonomies, just to name a few.

The construction of a concept representation is typically based on identifying 'concepts' in documents. Frequently, documents do not contain express concepts—instead they contain words from which concepts can often be inferred. By way of nonlimiting example, terms and their juxtapositions within documents can serve as indicators of latent concepts. Accordingly, latent concepts can often be estimated using a statistical latent variable model. In one approach, a latent variable analysis is applied to determine the concepts by deconvolving a document feature space created with a bump-hunting procedure based on a set of terms extracted from the document set. The resulting concept representation can be organized with different concept levels and/or facets. In one form, the concept representation is provided as one or more data structures corresponding to an acyclic directed graph and can be visualized as such.

A document representation is provided by mapping documents of a given corpus to the above-indicated concept representation. Alternatively or additionally, an initial concept representation can be restructured by equivalence mapping before a document representation is provided. From the document representation, different document signatures can be generated specific to various text analysis applications, such as: (a) information retrieval—retrieve 'relevant' documents in response to a query, such as a boolean or 'query by example'; (b) document clustering—organize documents into groups according to semantic similarity; (c) document categorization, routing, and filtering—classify documents into predefined groups; (d) summarization—provide synopses of individual documents or groups of documents; (e) information extraction—extract pre-defined information pieces from text, such a company names, or sentences describing terrorist activity; (f) entity linkage—find relationships between entities, such as recognizing that "Joe Brown is President of The Alfalfa Company" or identify linkages between airlines in the context of a merger, to name just a few examples; (g) event detection—automatically detect and summarize significant events (usually in real time), and deliver summary and supporting evidence to interested parties; (h) corpus navigation—browse a corpus; (i) topic discovery and organization—organize topics or concepts within a corpus; and/or (j) question answering—provide answers to questions. Question answering can go beyond retrieving documents that are 'relevant' to a question. In some applications, the answer can be directly extracted from a relevant document. In others, it is acknowledged that the answer to a question might not be contained in a single document—instead different parts of the answer might occur in different documents, which could be identified and combined by the application.

Accordingly, these and other embodiments of the present invention provide a combination of generic and application-specific components that are better-suited to current text mining objectives. FIG. 1 diagrammatically depicts computer system 20 of another embodiment of the present invention. System 20 includes computer 21 with processor 22. Processor 22 can be of any type, and is configured to operate in accordance with programming instructions and/or another form of operating logic. In one embodiment, processor 22 is integrated circuit based, including one or more digital, solid-state central processing units each in the form of a microprocessor.

System 20 also includes operator input devices 24 and operator output devices 26 operatively coupled to processor 22. Input devices 24 include a conventional mouse 24a and keyboard 24b, and alternatively or additionally can include a trackball, light pen, voice recognition subsystem, and/or different input device type as would occur to those skilled in the art. Output devices 26 include a conventional graphic display 26a, such as a color or noncolor plasma, Cathode Ray Tube (CRT), or Liquid Crystal Display (LCD) type, and color or noncolor printer 26b. Alternatively or additionally output devices 26 can include an aural output system and/or different output device type as would occur to those skilled in the art. Further, in other embodiments, more or fewer operator input devices 24 or operator output devices 26 may be utilized.

System 20 also includes memory 28 operatively coupled to processor 22. Memory 28 can be of one or more types, such as solid-state electronic memory, magnetic memory, optical memory, or a combination of these. As illustrated in FIG. 1, memory 28 includes a removable/portable memory device 28a that can be an optical disk (such as a CD ROM or DVD); a magnetically encoded hard disk, floppy disk, tape, or cartridge; and/or a different form as would occur to those skilled in the art. In one embodiment, at least a portion of memory 28 is operable to store programming instructions for selective execution by processor 22. Alternatively or additionally, memory 28 can be arranged to store data other than programming instructions for processor 22. In still other embodiments, memory 28 and/or portable memory device 28a may not be present.

System 20 also includes computer network 30, which can be a Local Area Network (LAN); Wide Area Network (WAN), such as the Internet; another type as would occur to those skilled in the art; or a combination of these. Network 30 couples computer 40 to computer 21; where computer 40 is remotely located relative to computer 21. Computer 40 can include a processor, input devices, output devices, and/or memory as described in connection with computer 21; however these features of computer 40 are not shown to preserve clarity. Computer 40 and computer 21 can be arranged as client and server, respectively, in relation to some or all of the data processing of the present invention. For this arrangement, it should be understood that many other remote computers 40 could be included as clients of computer 21, but are not shown to preserve clarity. In another embodiment, computer 21 and computer 40 can both be participating members of a distributed processing arrangement with one or more processors located at a different site relative to the others. The distributed processors of such an arrangement can be used collectively to execute routines according to the present invention. In still other embodiments, remote computer 40 may be absent.

Operating logic for processor 22 is arranged to facilitate performance of various routines, subroutines, procedures, stages, operations, and/or conditionals described hereinafter. This operating logic can be of a dedicated, hardwired variety and/or in the form of programming instructions as is appropriate for the particular processor arrangement. Such logic can be at least partially encoded on device 28a for storage and/or transport to another computer. Alternatively or additionally, the logic of computer 21 can be in the form of one or more signals carried by a transmission medium, such as network 30.

System 20 is also depicted with computer-accessible data sources or datasets generally designated as corpora 50. Corpora 50 include datasets 52 local to computer 21 and remotely located datasets 54 accessible via network 30. Computer 21 is operable to process data selected from one or more of corpora 50. The one or more corpora 50 can be accessed with a data extraction routine executed by processor 22 to selectively extract information according to predefined criteria. In addition to datasets 52 and 54, corpora data may be acquired live or in realtime from local source 56 and/or remote source 58 using one or more sensors or other instrumentation, as appropriate. The data mined in this manner can be further processed to provide one or more corresponding data processing outputs in accordance with the operating logic of processor 22.

Figure 2:
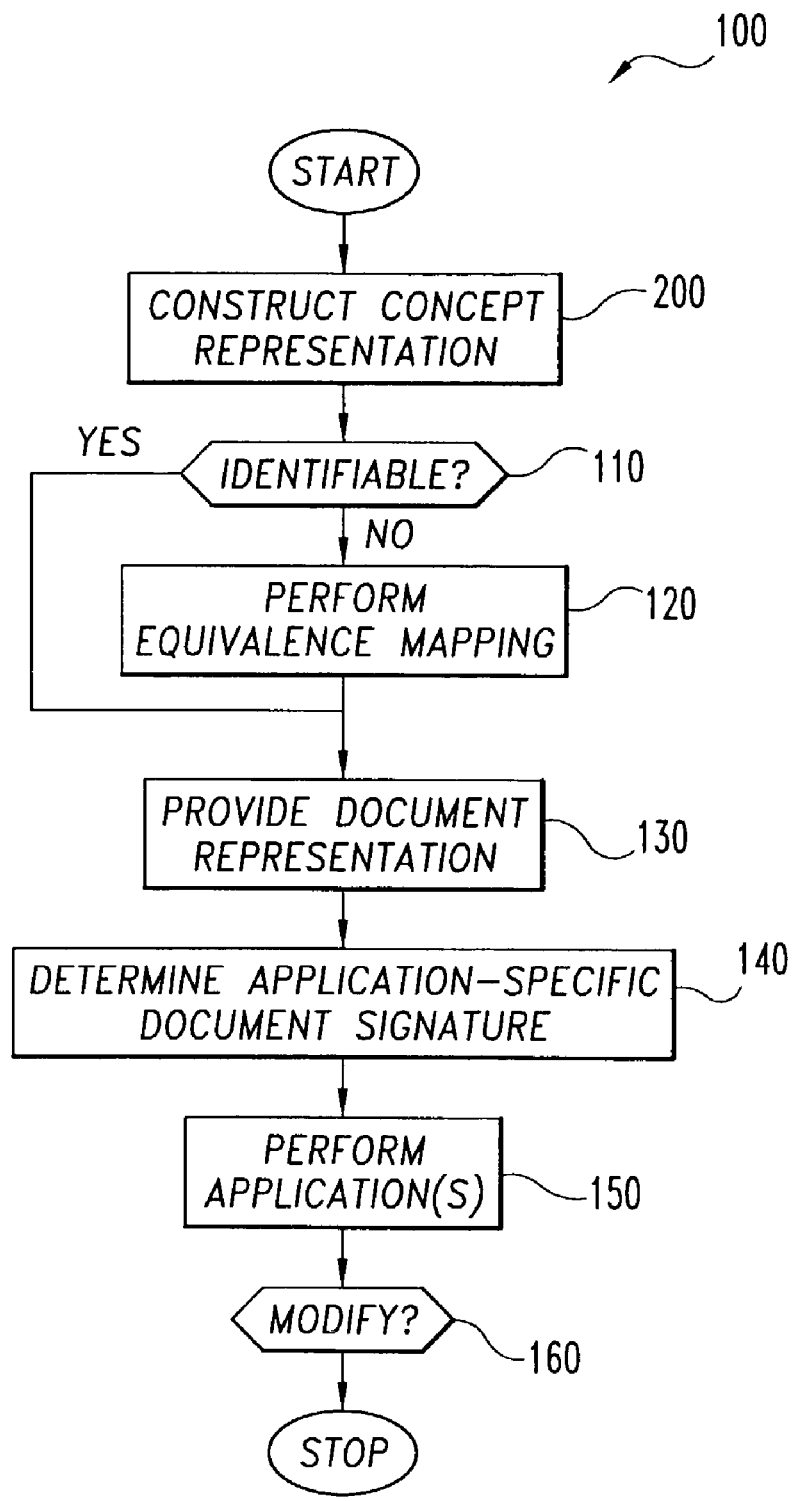
FIG. 2 is a flowchart illustrating details of a routine that can be executed with the system of FIG. 1.

Referring to FIG. 2, a flowchart of document processing routine 100 is presented. Routine 100 can be performed with system 20 in accordance with operating logic of processor 22. Routine 100 begins with concept representation subroutine 200. Subroutine 200 is directed to the construction of a concept representation that is used in later stages and procedures of routine 100.

Figure 3:
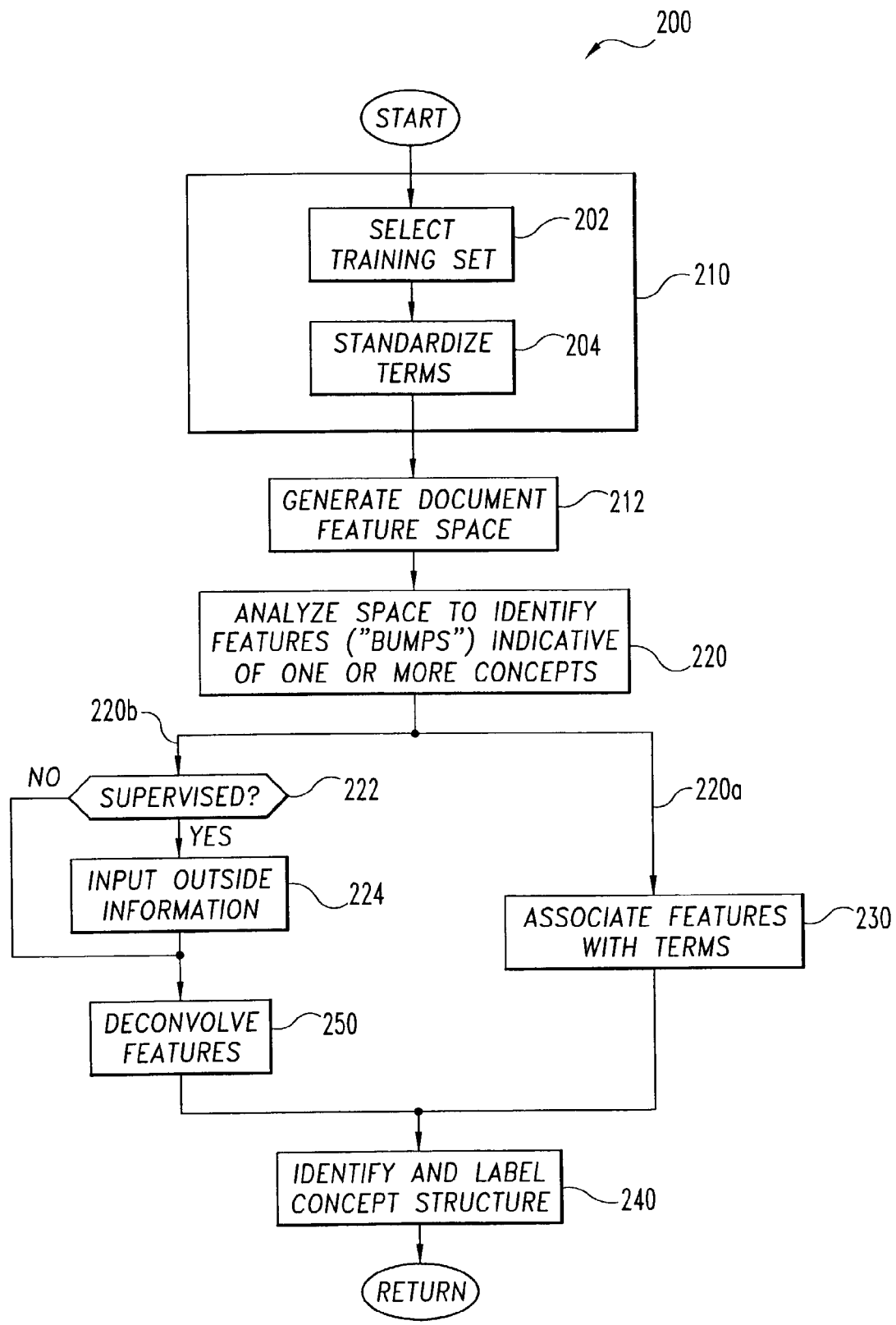
FIG. 3 is a flowchart illustrating details of a subroutine for the routine of FIG. 2.

Referring to FIG. 3, subroutine 200 starts with document preprocessing stage 210, which includes selection of a set of text documents for training purposes in operation 202. These documents can be selected from among corpora 50 with system 20. Typically the documents are selected to be representative of a single corpus or collection that has some aspect of commonality, such as document type, overall topic, or the like; however, documents from diverse collections/corpora can alternatively be selected.

In one form, it is desirable that the set of documents selected for training are representative of documents expected to be used when applying the concept representation to various applications. Alternatively or additionally, it may be desirable to select a training set of documents that is relatively large to make it more likely to 'discover' infrequent or 'rare' concepts. In one instance of this approach, concept representation construction is based on a training set of at least 100,000 text documents, although in other instances more or fewer training document could be used.

Preprocessing stage 210 also includes term standardization operation 204 in which a set of terms S is determined for processing in later stages. Such standardization can include typical stemming, identification of phrases (i.e., word sequences that should be treated as one unit), and mapping known synonyms to a common canonical form. Typically, functional words or 'stop' words will be removed when determining this standardized lexicon. Functional words include modifiers such as 'a', 'the', and 'this' that are necessary for grammatical comprehension but do not directly contribute to a concept. Functional words can be removed by comparing them with a list of known functional terms—a 'stop-word' list. Alternatively, if a stop-word list is not available (for example, if a foreign language is being analyzed for which a stop-word list is not known), functional words can be identified automatically via a topicality calculation executed with system 20. In such a calculation for a given term, let A be the number of documents that contain the term. Let N be the number of documents in the test collection, and let T be the total number of times the term occurs in the collection. Then if the term is distributed randomly T times across the N documents, we would expect it to occur in $$E = N - N\left(1 - \frac{1}{N}\right)^T$$

documents. If the term occurs in significantly more documents than expected by chance, it is considered to be regularly distributed, typical of a functional word. Thus, functional terms can be automatically identified as those terms for which $$\frac{A}{E} > 1 + \lambda,$$

where $\lambda$ is a threshold that may have been selected based on previous experience, or based on statistical considerations. In one embodiment, $\lambda=0.25$ has been found to be adequate for English documents. A. Bookstein, S. T. Klein, and T. Raita, "Clumping Properties of Content-Bearing Words" *Journal of the American Society for Information Science* (published on the world wide web 1998) is cited as a source of background information concerning such approaches.

From term standardization operation 204, subroutine 200 exits preprocessing stage 210 and proceeds to stage 212. In stage 212, a document feature space is generated as a function of the term set S selected during operation 204. In one embodiment, the document feature space is provided in the form of a term-by-document frequency matrix; where, the $(ij)^{th}$ entry contains the frequency of the $i^{th}$ term in the $j^{th}$ document, an example of which follows in Table I:

TABLE I

|  | Doc 1 | Doc 2 | Doc 3 | Doc 4 | Doc 5 | Doc 6 | Doc 7 | Doc 8 | Doc 9 |
| --- | --- | --- | --- | --- | --- | --- | --- | --- | --- |
| Football | 3 | 1 | 0 | 2 | 0 | 0 | 1 | 0 | 0 |
| Ball | 0 | 5 | 0 | 0 | 0 | 3 | 3 | 0 | 0 |
| Sports | 2 | 0 | 3 | 3 | 0 | 2 | 5 | 3 | 2 |
| Basketball | 0 | 0 | 4 | 1 | 3 | 0 | 0 | 1 | 2 |
| Game | 0 | 0 | 1 | 1 | 0 | 0 | 0 | 2 | 0 |
| Skate | 0 | 0 | 0 | 0 | 1 | 0 | 0 | 0 | 0 |

It should be understood that in other embodiments, a term-by-document frequency matrix can include fewer, but typically, many more documents and/or terms. Alternatively or additionally, the frequency can be weighted based on one or more criteria, such as an information-theoretic measure of content or information contained in a given term and/or document. In one such form, term frequencies are weighted by a measure of their content relative to their prevalence in the document collection. To standardize for documents of varying sizes, the columns of a weighted term-by-document frequency matrix might also be normalized prior to analysis.

A term-by-document frequency matrix is often useful in discovering co-occurrence patterns of terms, which can often correspond to underlying concepts. First-order co-occurrence patterns relate terms that frequently occur together in the same documents; second-order co-occurrence patterns relate terms that have similar first-order co-occurrence patterns, so that two terms can be related by second-order co-occurrence even if they never occur together in a document.

As an addition or alternative to a term-by-document frequency matrix, terminological patterns can be identified through application of a statistical language model that accounts for the order in which terms occur. In one nonlimiting example, a trigram model is utilized. For this trigram model approach, the probability of the next word given all previous words depends only on the previous two words (it satisfies a second order Markov condition). Correspondingly, the probability of a sentence of length 'n' is given by the following equation:

$$Pr(w_{1,n}) = \prod_{t=1}^{n} Pr(w_t | w_{i-2}, w_{i-1})$$

The bigram and trigram probabilities can be estimated using sparse data estimation techniques, such as backing off and discounting.

Another embodiment may alternatively or additionally employ co-occurrence statistics from windows of "n" words in length within documents. A further embodiment may alternately or additionally employ natural language processing techniques to extract from each sentence the triple (S,V,O) representing the subject, verb, and object of the sentence. The (S,V,O) triple might additionally be mapped to a canonical form. The (S,V,O) triple would then replace the term in the term-by-document matrix. In still other embodiments, a different type of terminological model suitable to define a desired type of document feature space for concept realization may be utilized as would occur to one skilled in the art. For the sake of clarity and consistency, the term-by-document frequency matrix model is utilized hereinafter unless otherwise indicated. It should be understood that the term-by-document frequency matrix can be represented by one or more data structures with system 20 that characterize a multidimensional document feature space as a function of the terms selected during operation 204. Optionally, some or all of the documents can be associated with one or more predefined groups and/or some or all of the terms can be associated with one or more predefined groups.

Subroutine 200 proceeds from stage 212 to stage 220. Stage 220 evaluates the term-by-document feature space generated by stage 212 to identify document and term relationships of statistical significance. In one implementation of stage 220, a bump-hunting procedure is utilized to identify feature space regions (or "bumps") of relatively high density that correspond to local maxima of the feature space. One form of this procedure is based on a generalized finite mixture clustering model. The paper, Heckman and Zamar, *Comparing the Shapes of Regression Functions*, University of British Columbia (Dated 2000) provides an example of bump-hunting analysis. In other embodiments, a different bump-hunting procedure and/or a different type of evaluation to identify statistically significant document and term relationships for concept recognition can be utilized.

Stage 220 outputs significant document features in relation to term set S. This relationship can be characterized as term-by-bump matrix. For the bump-hunting implementation, features are the discovered bumps in the document feature space, and the corresponding matrix M representation is of a binary type, having entries only of either one to represent a strong association between a term (row) and a bump (column) or zero to represent the absence of a significant term/bump association. Entries of one or zero in matrix M can be determined by applying one or more statistical tests which indicate where the terms independently tend to statistically "clump together."

One nonlimiting example includes comparing a relevant characteristic or parameter of the term t for bump b with the set of all other bumps by using a statistical hypothesis test. For this test, let $\theta_{tb}$ be the parameter of interest for term t in bump b, and let $\theta_{tb\sim}$ be the parameter of interest for term t in set of others bumps (where b~ corresponds to á Boolean inversion to represent "not bump b"), then the hypotheses test becomes:

$H_o$: $\theta_{tb} = \theta_{tb\sim}$ $H_A$: $\theta_{tb} > \theta_{tb\sim}$

Rejecting $H_o$ in favor of $H_A$ at some level $\alpha$ suggests clumping of term t in bump b. The threshold $\alpha$ is selected to control the number of false positives. In one form values of $\alpha=0.01$ or $\alpha=0.001$ were found to be desirable and the 'parameter of interest' was defined by reference to one of three simple models:

1. Bernoulli: $\theta_{tb}$=proportion of documents in bump b that contain term t;

2. Poisson: $\theta_{tb}$=average number of occurrences of term t in documents in bump b;

3. Multinomial: $\theta_{tb}$=average proportion of terms in documents that are t.

Hypotheses are tested using standard likelihood ratio tests. It turns out that the likelihood ratio test statistics are the same as mutual entropy scores between t and b, this approach could also be called an entropy test.

From matrix M, a corresponding document-by-bump matrix D can be constructed. The columns of matrix D are the same bumps as in matrix M, and the rows of matrix D are the training documents. As in the case of matrix M, matrix D is binary with an entry of one indicating a significant association between the document (row) and bump (column) and entries of zero indicating the absence of a significant association. For a given document, document/bump associations can be determined by considering the term/bump associations for terms included in the given document, and applying one or more statistical tests of the type used in establishing matrix M by reversing the roles of term and document. In bump-hunting, a document might be assigned to one bump or no bump. A bump is highly specific, and likely a composition of multiple concepts (e.g., a collection of reports describing altitude deviation due to fatigue). So, though a document is initially assigned to one 'bump' in bump-hunting, it is likely related to multiple bumps.

The bump-hunting based binary form of matrices D and M is typically sparse. As used herein, a "sparse matrix" means a matrix in which five percent or less (<5%) of the entries are considered to be greater than or less than zero. A sparse matrix has been found to surprisingly improve the performance of the deconvolution procedure to be described hereinafter.

From stage 220, subroutine 200 continues with parallel processing branches 220a and 220b. In branch 220a, operation 230 associates terms with features. For the bump-hunting implementation, the bump features can each be characterized by a term or combination of terms that best distinguish them from one another using a multivariate discrimination algorithm. In one example based on an analysis of aviation safety reports, one bump was characterized by the terms: crew, rest, fatigue, duty time, altimeter, altitude deviation. This bump identified a series of reports in which the pilot made an altitude deviation because he or she was fatigued. Two low-level concepts can be gleaned from these reports: experiencing an altitude deviation and experiencing fatigue. These concepts can be discovered from matrix M by deconvolving the bumps into their component concepts.

Deconvolution is performed in branch 220b. Branch 220b begins with conditional 222 that tests whether concept recognition processing is to be supervised or not. If the test of conditional 222 is true, supervisory information or outside knowledge is input in stage 224. In one example, outside knowledge is input in stage 224 by providing a vocabulary taxonomy (domain inspired or generic). The taxonomy can be groups of words that 'go together' such as a controlled vocabulary. For instance, in aviation safety, controlled vocabularies have been constructed for maintenance-related terms, weather terms, human factor terms, etc. Additionally or alternatively, a predefined vocabulary hierarchy could be utilized.

Further forms of outside input that could be used alone or in combination with others include providing examples of documents that belong to different categories of interest, for example, maintenance related, weather related, etc. in the aviation field and/or providing structured external knowledge, such as one event is always preceded by another event. In one implementation, the outside knowledge is mathematically represented as a Bayesian prior opinion. For this implementation, the strength of the prior 'opinion' can also be provided, which determines the relative weight given to the prior opinion compared to evidence discovered in the documents of the corpus. In other implementations, the outside knowledge is differently represented alone or in combination with the Bayesian prior opinion form. From stage 224, branch 220b proceeds to deconvolution procedure 250. Likewise, if the test of conditional 222 is negative, branch 220b bypasses the input of outside knowledge in stage 224 to continue with deconvolution procedure 250. Accordingly, procedure 250 is executed in an unsupervised mode when stage 224 is bypassed.

Figure 4:
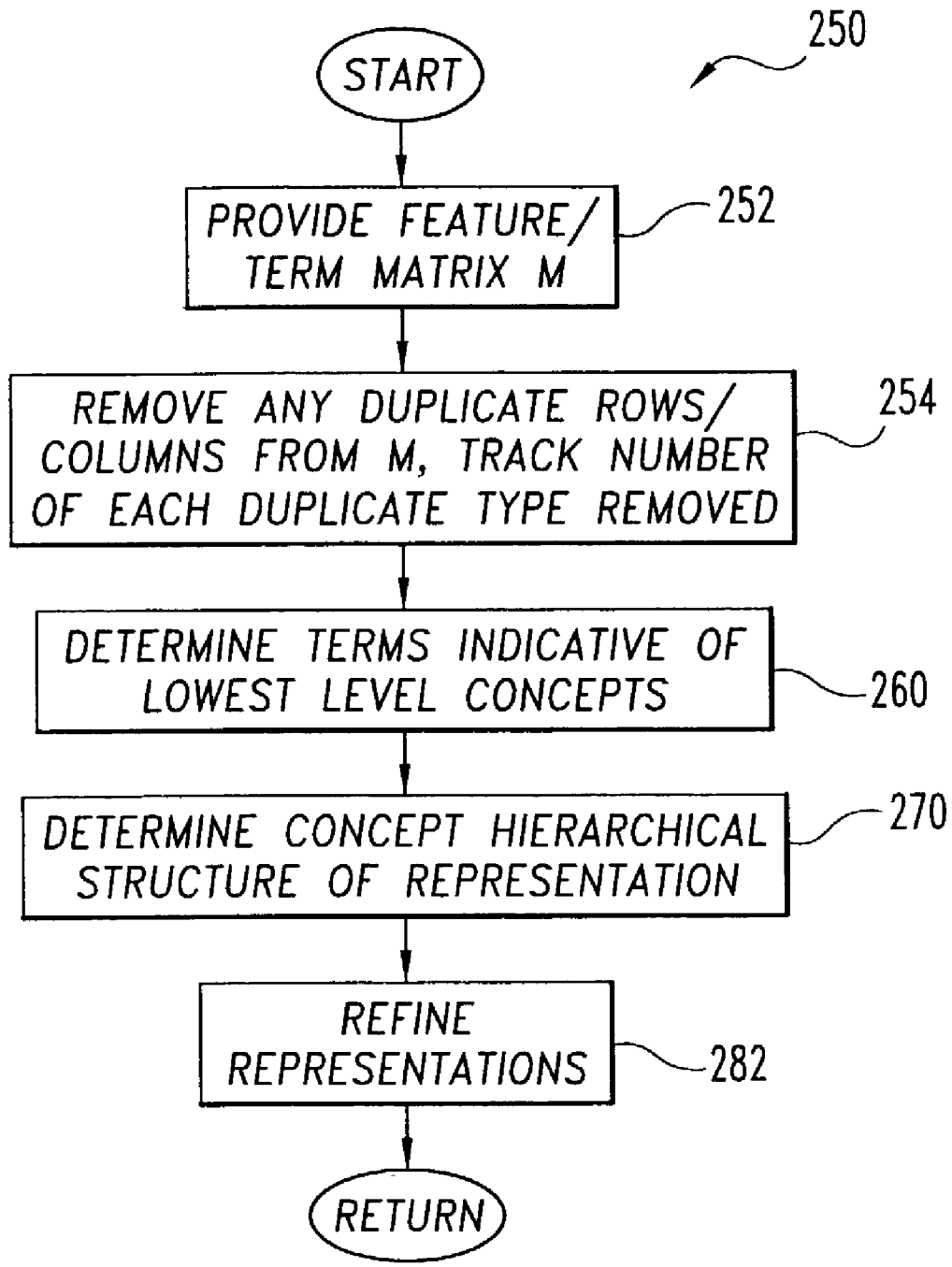
FIG. 4 is a flowchart illustrating details of a procedure included in the subroutine of FIG. 3.

Referring to the flowchart of FIG. 4, further details of deconvolution procedure 250 for a bump-hunting based binary matrix M are next described. Procedure 250 begins with the analysis of matrix M to remove any duplicate rows or columns in stage 252. The identity and quantity of row and column duplication is recorded for optional use in weighting certain aspects of the results in a later stage. After stage 252, matrix M has TR number of different terms (rows) and BC number of different bumps (columns). The removal of redundant rows/columns can also be performed for matrix D, recording the removal information for approval use in weighting, etc. Procedure 250 proceeds from stage 252 to operation 260.

Deconvolution is based on identifying partial orders in M. Given T1 and T2 are two sets of terms, then a partial order $T_1 \leqq T_2$ exists if whenever a term in T1 is associated with a bump, every term in T2 is associated with the bump; equality holds if and only if terms in T1 and T2 are associated with exactly the same bumps. T2 is said to subsume T2 if the partial ordering is strict, i.e., if T1<T2.

During operation 260, equivalence and subsumptive relationships among the rows (terms) of matrix M are identified. Equivalence relationships are grouped together into term equivalence classes and treated as a common unit in subsequent analyses. Subsumption indicates relationships between different hierarchical levels. The subsumptive relationships between term (or term equivalence class) pairs are considered to determine a corresponding directed graph. In constructing the directed graph, an arrow is drawn from A to B (i.e., A→B) if and only if A>B and there exists no term or term equivalence class C such that B<C and C<A. For example, for terms A, B, C, D, and E with the subsumptive relationships A>C, A>E, and C>E; the resulting path is A→C→E.

Figure 6:
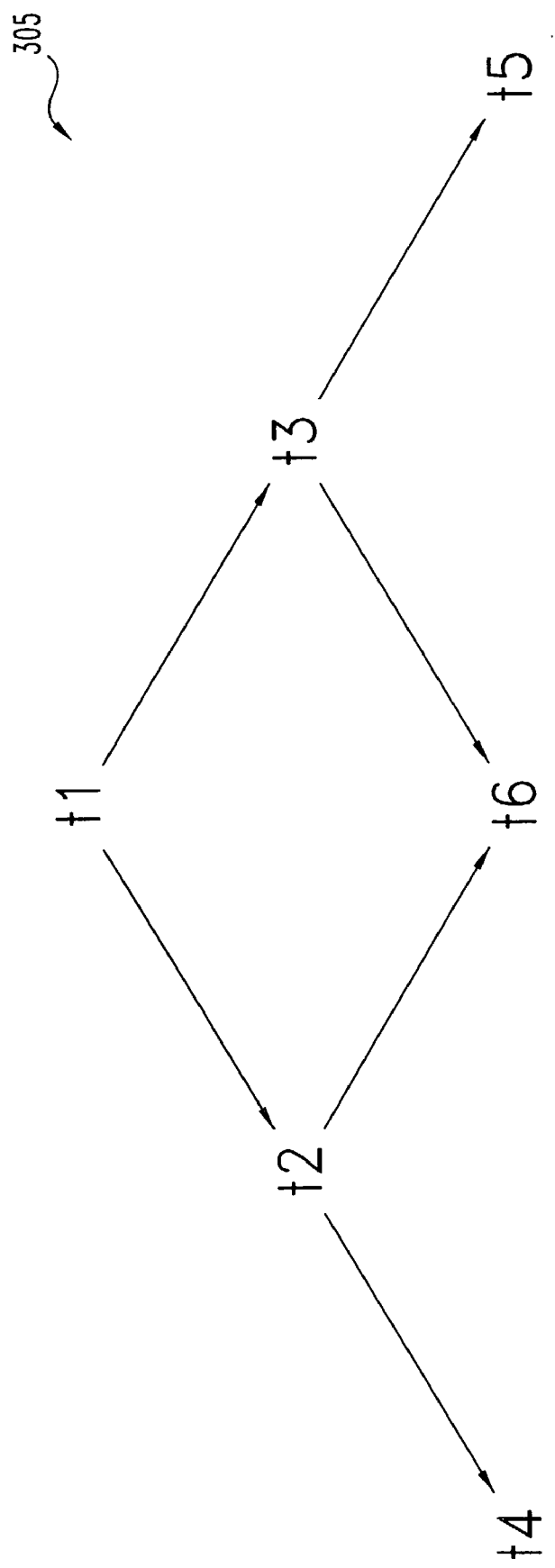
FIG. 6 is a diagram of a term tree corresponding to the matrix of FIG. 5.

Referring to FIG. 5, a nonlimiting example of a term-by-bump matrix M is shown as matrix 300 to aid in understanding operation 260. Six rows corresponding to terms t1–t6 are shown in FIG. 5 with four columns corresponding to bumps b1–b4. For the FIG. 5 example, the relatively infrequent entries of 1 in matrix 300 for terms t4–t6 and the association of terms t4–t6 with bumps that are also associated with other terms suggest that terms t4–t6 are subsumed by one or more of terms t4–t6. In particular, the subsumptive relationships are t1>t2, t1>t3, t1>t4, t1>t5, t1>t6, t2>t4, t2>t6, t3>t5, and t3>t6, The resulting directed paths are t1→t2→t4, t1→t2→t6, t1→t3→t5, and t1→t3→t6. These paths are presented as term tree 305 in FIG. 6.

In one nonlimiting approach to efficiently construct the directed graph, the concept hierarchy is constructed from the bottom up. First, all terms are identified from matrix M that indicate base or lowest level concepts. Terms may be associated with more than one lowest level concept. Term equivalence class Ti indicates a base level concept if there is no equivalence class Tj such that Tj<Ti. Let S1 denote the set of all such terms or term equivalence classes. It follows that each remaining term subsumes at least one term in S1. Of the remaining terms, identify those terms Tk for which there is no term or term equivalence class Tj not in S1 such that Tj<Tk. Let S2 denote the set of all such terms. Repeat the process to identify sets S3, S4, etc. until no more terms remain. This process yields a collection of disjoint sets of terms or term equivalence classes S1, S2, . . . , Sm. The directed graph is readily constructed subject to the following constraint: arrows into terms in Sn are only allowed from terms in S(n+1). Thus, for term Ti in Sn, Tj→Ti if and only if Tj>Ti and Tj is in S(n+1). From the example in FIGS. 5 and 6, three different lowest level concepts can be identified corresponding to the term groups (t1, t2, t4); (t1,t2,t3,t6); and (t1, t3, t5). These concepts are identified as c(1,1), c(1,2), c(1,3), respectively.

Figure 7:
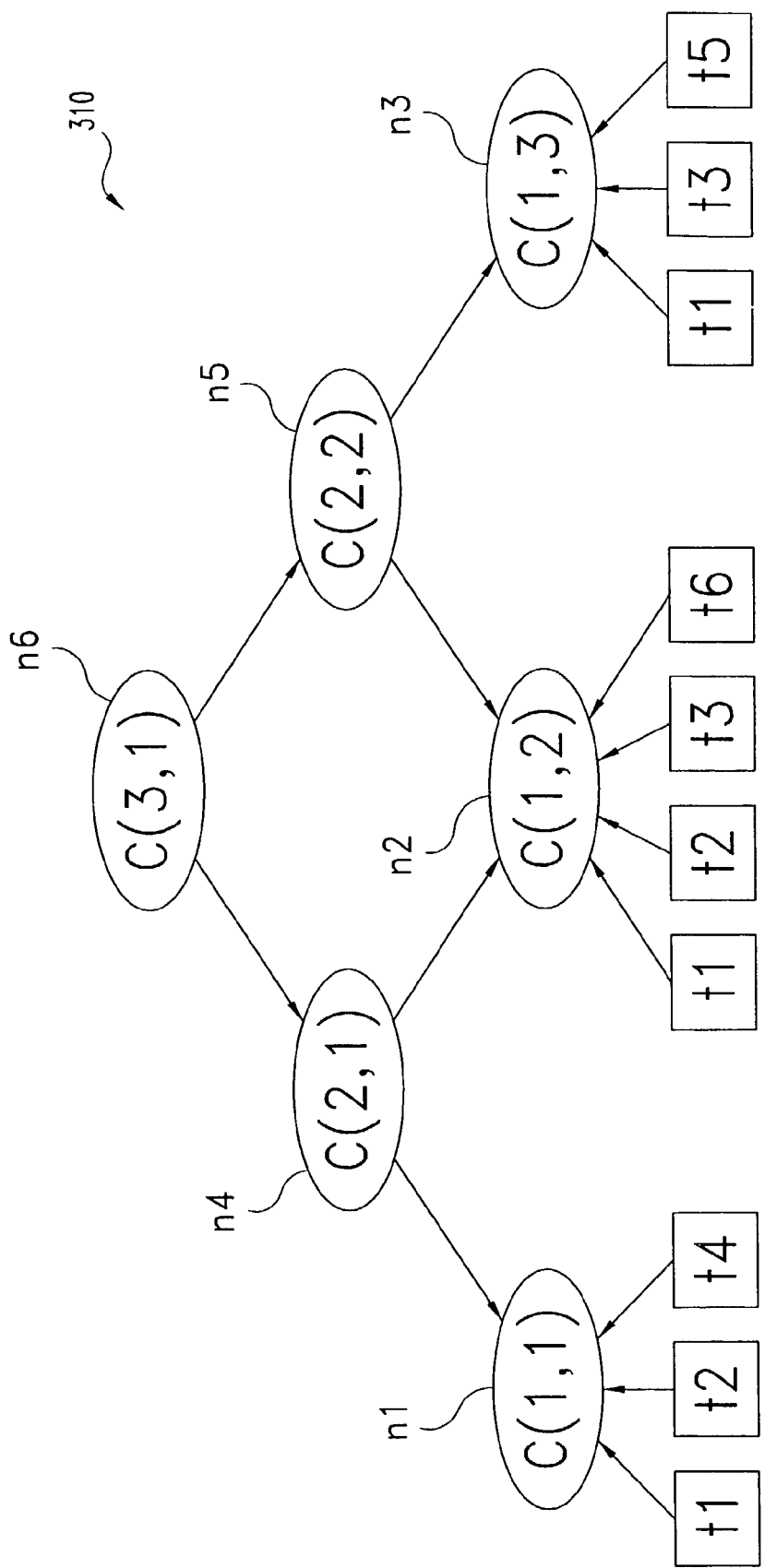
FIG. 7 is a diagram of a concept representation formed from the matrix of FIG. 5 and diagram of FIG. 6 that can be provided with the routine of FIG. 2.

From operation 260, procedure 250 continues with operation 270 in which the hierarchical structure of the concepts is determined. In one approach, a concept structure can be provided by comparing the content of the term groups for these lowest concepts and utilizing the corresponding term tree structure. For the example of FIGS. 5 and 6, the occurrence of terms t1–t3 in more than one of these groups indicate correspondence to higher level concepts based on frequency. Second level concepts c(2,1) and c(2,2) correspond to terms t1 and t2, and t1 and t3, respectively, and the third (highest) level concept c(3,1) corresponds to term t1. FIG. 7 presents the resulting concept representation 310 with nodes n1–n6 corresponding to the concepts c(1,1), c(1,2), c(1,3), c(2,1), c(2,2), c(3,1); respectively. Notably, through partial order analysis, operations 260 and 270 can be performed generally at the same time. In the general case, an m-level concept structure is formed, with each node in the term tree (corresponding to a term equivalence class) corresponds to a concept. The concept is 'indicated' by the set of terms that are descendents of the corresponding node in the term tree, i.e. there is a path from the node to each descendent. Thus, terms that are high on the term tree tend to represent more general concepts, and they tend to indicate multiple low level concepts; conversely, terms that are low on the term tree tend to represent specific concepts, and they tend to indicate few low level concepts.

Procedure 250 proceeds from operation 270 to stage 282 to refine concept relationships. This refinement has been found to frequently reduce noise in the process. Because of potential noise in matrix D, and possible errors in constructing M, the concept structure can often contain too many highly overlapping concepts. Stage 282 includes evaluating the nodes for candidates to merge. Such merging can be determined in accordance with a sequence of statistical hypothesis tests that start at the lowest level of the representation by identifying each term with its concept connectors, and then testing whether two equivalence classes can be merged. Such refinements can be based on a measurement error model. For this model, let $\alpha$ be the error of commission [$M_{ij}$=1 in error] in associating terms with bumps, and let $\beta$ be the error of omission [$M_{ij}$=0 in error] the goal is to identify a smaller set of equivalence classes; where $M_{ij}$ is the i,j entry of matrix M. The parameters $\alpha$ and $\beta$ can be specified by the user, or they can be estimated from the data by maximizing a likelihood function. Let $\underline{m}$ be a response vector (row in M) for an equivalence class. We can compute $p(\underline{m})$ by reference to the measurement error model, for example:

$$p(\underline{m}=(0\ 0\ 1\ 1)|eq.\ class\ c=(0\ 1\ 1\ 1))=(1-\alpha)\beta(1-\beta)^2$$

The conditional probability mass function for m given c is:

$$p(m|c) = \prod_{j=1}^{p}[\beta^{1-m_j}(1-\beta)^{m_j}]^{c_j}[\alpha^{m_j}(1-\alpha)^{1-m_j}]^{1-c_j}$$

Because some equivalence classes are more populated than others, classes may be merged in the posterior probability via the following equation:

$$Pr(eq.\ class\ C|\underline{M}) \propto Pr(eq.\ class\ C) \cdot p(\underline{M}|eq.\ class\ C)$$

and assign $\underline{M}$ to most probable equivalence class. Generally, the effect is to remove some nodes and their connectors from the term tree. In an alternative implementation, the likelihood function is computed for the collection of term equivalence classes:

$$L = \prod_{h=1}^{n}\sum_{c}p(c)p(m|c)$$

Then two equivalence classes c_I and c_j are merged that yield the smallest change in likelihood function. The process is continued until the change from the original likelihood (before any mergers) is large enough to be statistically significant. Other measurement error models can be exploited in a similar manner for different embodiments.

After connector removal, a further refinement is performed by adding weights to the remaining connectors. These weights can correspond to probabilities, i.e, $\alpha_{tC_{Ai}}=Pr$(Term $t$ occurs in $n$-word span|concept $C_{Ai}$ is present), and $\alpha_{C_{Ai};C_{Bj}}=Pr$(Level $A$ concept $C_{Ai}$ is present|Level $B$ concept $C_{Bj}$ is present);

where A and B designate different hierarchical levels of the representation.

Generally, individual features (e.g., terms) of a concept representation generated in accordance with procedure 250 are directly associated with low level concepts through weights, and are indirectly (and nonlinearly) associated with high level concepts by association with low level concepts. The representation is typically sparse, having 95% or more of the weights set to zero. In procedure 250, the bumps are deconvolved by reference to a multi-level latent variable model, where the latent variables are identified as concepts. The latent variable model is used to construct layers of concepts, and to infer associations between higher order concepts and lower order concepts. The concept representation is one layer or level at a time in a hierarchical fashion from the lowest to highest level concepts. Representation 310 determined from matrix 300 is merely an example to aid in understanding the present application. In practice, the term-by-bump matrix and corresponding representation would typically be much larger. A visualization of the concept representation may be presented in an acyclic directed graph form, a different form, or may not be visually represented as all. In one form, the concept representation and term-by-bump matrix are each represented by one or more data records/structures stored with system 20.

Returning to FIG. 3 from procedure 250, branches 220a and 220b join at stage 240 in which the nodes of the concept representation are labeled. Concept labels can be acquired in the construction of the concept hierarchy as rows of terms are identified with different nodes. Typically, more general terms (e.g., medical) provide labels for higher-order concepts, and specific terms (e.g., cortical dysplasia) provide labels for lower-order concepts.

Figure 8:
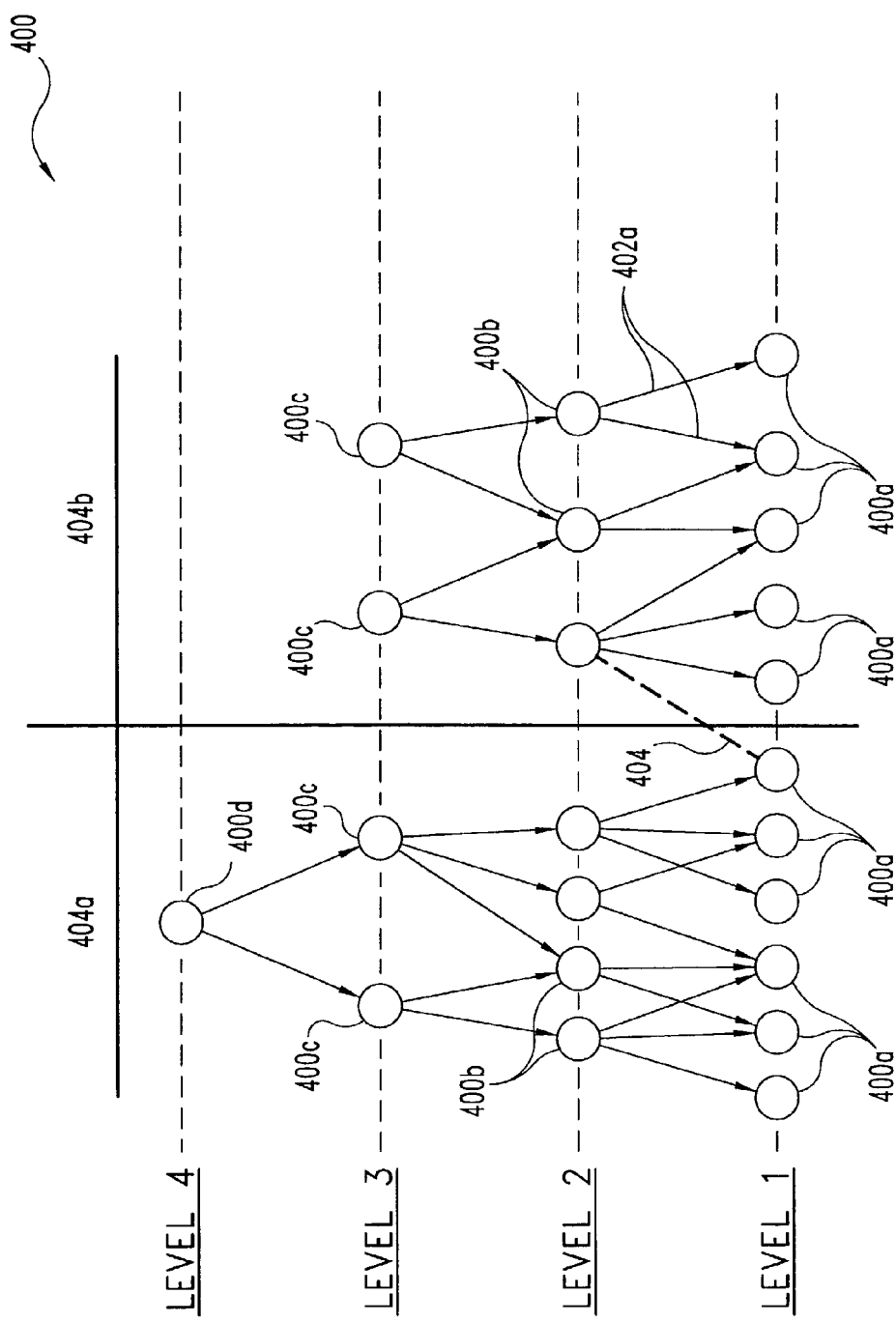
FIG. 8 is another concept representation that can be provided with the routine of FIG. 2.

Stage 240 further includes evaluating the separability of different subsets of the concepts. For the type of concept representation visualization depicted in FIG. 6, this separability is akin to the ease with which different hierarchical portions can be cleaved apart along vertical lines to provide different facets of the representation. Referring additionally to FIG. 8, a visualization of concept representation 400 of another embodiment of the present invention is illustrated. Relative to representation 310, representation 400 includes several more nodes and is arranged to better illustrate the potential to separate the representation structure into different groups or facets. Concept representation 400 includes lowest level nodes 400a (Level 1) connected to the next lowest level of concept nodes 400b by connectors 402a (Level 2). Level 3 nodes 400c and Level 4 node 400d, are also shown linked by connectors 402b and 402c, respectively. Only a few of these features are designated by reference numerals to enhance clarity. FIG. 8 further illustrates a division or separation of concept representation 400 into two hierarchical, multilevel subsets 404a and 404b that are respectively to the left and right of a vertical line through connector 404. Connector 404 is shown in broken line form to better illustrate that it is broken by the separation. For this depiction, only one connector is "broken" by the separation indicating a relatively high degree of independence between subsets 404*a* and 404*b* compared to other groupings. In contrast, separation along horizontal lines—between different levels—separates concepts based on the degree of relative subordination. The identification of such multilevel hierarchical subsets of a concept representation or "facets" can provide an unsupervised approach to efficiently compare documents across correspondingly different 'respects'.

To identify such subsets in stage 240, different hierarchical groupings are evaluated, finding those that minimally disrupt the 'goodness-of-fit' as measured by the likelihood function of the representation. This evaluation can be performed for each hierarchical level of the representation. In one form, an iterative gradient descent procedure is executed to determine the best separations for a predefined number of groupings. In other embodiments, different approaches can be utilized to determine desired subgroupings of a supervised and/or unsupervised nature.

From stage 240, subroutine 200 returns to conditional 110 of routine 100. Conditional 110 tests whether the concept representation is identifiable or not. This determination can be made empirically. For example, a model is nonidentifiable if it has multiple "best" solutions that are approximately equally likely. Applying the test of conditional 110 to the type of concept representations determined according to the present invention, such a representation could be nonidentifiable if there were one or more different representations that each explained the data approximately just as well. In such a situation, one cannot determine which representation should be applied. One specific empirical test for identifiability is based on the empirical observed information matrix:

$$I_{L \times L} = \sum_{h=1}^{N} \left(\frac{\partial L_h}{\partial \Psi}\right)_{\hat{\Psi}} \left(\frac{\partial L_h}{\partial \Psi}\right)'_{\hat{\Psi}}$$

where $L_h$ is the contribution of the $h^{th}$ observation to the log likelihood function, and $\Psi$ is the set of all parameters not constrained to be zero. The representation is identifiable if the I is full rank; otherwise, it is not.

Upon the discovery that the representation is nonidentifiable, several surprising solutions have been discovered that may be utilized separately or in combination. These solutions include selection of a procedure, such as bump-hunting, to increase sparseness of the resulting term-concept weights of the representation. Using outside knowledge sources also serves to impose constraints on the weights in a manner likely to increase identifiability. If the result is still nonidentifiable, further solutions include simplifying the model by applying one or more of the following: restricting the number of levels permitted; mapping the nonidentifiable representation to a strict hierarchical representation, where each subordinate concept (child) can only be associated with one concept (parent) of the next highest level; or map the nonidentifiable representation to two or more identifiable representations, such as those groupings provided in stage 240.

Accordingly, if the test of conditional 110 is not true, the concept representation is modified in stage 120 by applying one or more of these solutions and then routine proceeds to stage 130. If the test of conditional 110 is negative, then stage 120 is by-passed and stage 130 is directly reached. In stage 130, a document representation is created by mapping one or more documents of the collection/corpus of interest to the concept representation.

In one example, let d be a row in the document-by-bump matrix D. For two-level concept hierarchy the following equations apply:

$$P(d; \theta) = \sum_{t2=1}^{n_2} \eta_{t2} \sum_{t2=1}^{n_1} \alpha_{t1,t2} \prod_{j=1}^{j} p(d_j | C_{t1})$$

where $n_2$ is number of level 2 concepts, $n_1$ is number of level 1 concepts, and $\eta_{t2} = Pr(C_{t2})$ $\alpha_{t1,t2} = Pr(C_{t1}|C_{t2})$ $$P(t_j|C_{t2}) = \pi_{t_1,j}^{d_j} (1 - \pi_{t_1,j})^{1-d_j}$$

with $\{\eta_{t2}\}$ $\{\alpha_{t1,t2}\}$ and $\{\pi\}$ being parameters that are estimated. However, it should be noted that $\pi$ is constrained to be zero when no terms in bump j define concept $C_{t1}$. Indeed, most of the parameters in $\{\alpha\}$ and $\{\pi\}$ are constrained to be 0 by the concept representation.

In an alternative mapping approach, each document is associated with one of the bumps. For example, let bump b might contain two concepts: fatigue and altitude deviation. Consider part of the term x Bump matrix that follows in Table II:

TABLE II

|  | bump 1 | bump 2 | bump 3 | bump 4 |
|---|---|---|---|---|
| Fatigue | 1 | 0 | 1 | 0 |
| Altitude_deviation | 1 | 1 | 0 | 1 |
| Altimeter | 0 | 1 | 0 | 1 |

Then documents in b are mapped to the concepts that are indicated by terms in bump 1. This provides us with a direct mapping of documents, without the need to create Doc x Bump Matrix.

New documents (i.e., documents not used in the training set) can be mapped to the concept representation in the same manner as the training set documents. Typically, the mapping is sparse—a new document is mapped to only a small fraction of all possible concept nodes, which facilitates storage and additional advanced computations with the document representation.

In the case that outside knowledge is available, such outside knowledge can be exploited in the analysis by imposing constraints, or by including the outside knowledge as covariates or Bayesian prior opinions in the analysis. To explain how supervision can influence the concept or document representation, two nonlimiting examples are described as follows. In the first example, suppose documents are preassigned to one or more of g groups. Such groups might correspond to categorical metadata describing the document. Let G be the length g indicator vector for a document indicating to which groups the document is assigned. Then G can be included in any one of several places in the hierarchical model used to map documents. Including G in the model can influence how documents are mapped to concepts; documents that belong to similar groups are more likely to be mapped to the same concepts.

In the second example, suppose some terms (not necessarily all terms) are preassigned to one or more facets. Then the iterative algorithm used to identify 'facets' in the concept structure is subject to the constraints imposed by the preassignments.

Routine 100 continues with stage 140. In stage 140, one or more documents signatures desired for corresponding applications are determined from the document representation. A document representation according to the present invention is typically directed to the recognition and organization of a wide range of salient information in a document. In contrast, a document signature represents only a portion or a condensation of a document representation that can be based on a particular application and/or user interests and interactions. Further, because documents can often be similar in different respects, no single document signature is typically 'best' for all applications. Several different document signatures can be utilized according to different applications and/or user inputs. Alternatively or additionally, an unsupervised approach can be utilized to provide several plausible document signatures.

A few examples of different approaches to document signature generation are as follows. In one form, a document representation has been 'flattened' into a vector representing C number of concepts (or, the elements of the vector are the document's weights for the topics). Because of our sparse representation, most weights are zero. In many applications, documents contain about one to ten concepts, including only concepts from the most appropriate (or representative) levels of the representation. Thus, one nonlimiting strategy is to "flatten" the document representation into concepts such that each document contains between one and ten concepts, and each concept is represented in, at most, a certain percentage of the documents (say p %). In the context of a comparative evaluation of documents based on such signatures, the probabilities of the concepts for each of two documents can be expressed as a vector of corresponding numbers to provide a measure of similarity of the two documents. Considering the criteria of whether a concept is jointly present (or not present) in both documents and whether a concept is important, four subsets can be created according to the following Table III:

TABLE III

| Jointly Present Concept | Important Concept? |
|---|---|
| No | No |
| No | Yes |
| Yes | No |
| Yes | Yes |

A common distance measure, such as a cosine similarity calculation, can be applied to each subset, and the results merged into a linear combination. This combination can be weighted in accordance with user input, empirical information, and/or predefined parameters. This approach addresses both general and specific similarity. As to specific similarity, high weights can be given to the distance calculation involving those "important" concepts. General similarity can be treated as similarity in the absence of any identification of important concepts. Alternatively, general similarity could eventually use a stored corpus-independent sense of the importance of different concepts. This is the notion that "terrorism" is a more important concept than "football".

In a query application, the terms of the query are treated as one of the documents. Furthermore, a query can be thought of as identifying the important concepts so that if the other document contains concepts that aren't in the query, then the first row of Table II applies (No, No). Accordingly, the contribution for such "superset" concepts can be reduced. Assuming a nonzero weighting, the effect results that distance increases as more and more concepts are added.

In another example of document signature generation, several alternatives can be generated in an unsupervised fashion based on the groupings (facets) identified during stage 240. Separate signatures are obtained for each grouping, based on concepts identified therein. The user may then visualize or otherwise analyze the signatures separately and select one most suitable to the problem at hand. Note that a portion of the documents will not be relevant to most of the facets or groupings (for example, many aviation safety reports do not address the aviation safety dimension).

Routine 100 continues with the performance of one or more applications in stage 150 by system 20. Examples of such applications include document filtering (queries), information retrieval, clustering, relationship discovery, event processing, and document summarization, to name just a few. Such applications can be facilitated by stage 130 and 140 outputs. The query approach described in connection with Table II is only one example of a document filtering application.

Another application is to perform document clustering. The previously described document signatures can be submitted to standard clustering algorithms to obtain different types of clustering. Indeed, many text analysis and visualization applications begin with clustering. Typically, the clustering is completely unsupervised such that the analyst has no influence on the types of clusters he or she would like to see. For example, in a collection of documents related to aviation safety, the analyst might want to direct clustering to compare and contrast maintenance problems with communication problems that precipitate an aviation incident or accident. Thus, there is a desire to provide for ways to supervise clustering. The selection among different type of document signatures upon which to base clustering is but one example that addresses this need.

Alternatively or additionally, clustering can be at least partially supervised by entering external knowledge during stage 224 of subroutine 200. Another approach includes starting with an unsupervised cluster analysis, but allowing the analyst to "correct" the cluster analysis by reallocating documents between clusters. A related, less restrictive approach has the analyst evaluate whether two documents are similar or not and provide the results of this evaluation as input. This approach does not have to allocate documents to clusters or pre-define clusters; only assess relative similarity. In one implementation, after an unrestricted cluster analysis, a panel of experts quantify similarity with a number between 0 and 1 for a series of paired documents (1 if they definitely belong together, 0 if they definitely do not belong together). The document pairs are presented with varying degrees of similarity according to the initial cluster analysis so the experts see documents that occur in the same cluster as well as documents that do not occur in the same cluster. The results of the paired comparison experiment are used to adjust the clustering. Alternatively or additionally, document signatures generated in the manner previously described could provide input.

The similarity sought by clustering can be multidimensional—such that documents can be similar in different respects. As an example, consider the aviation safety domain, where four dimensions of aviation safety have been well documented: 1) Mechanical/maintenance, 2) Weather, 3) Communication problems, and 4) Pilot error. In comparing two aviation incident reports, an aviation safety expert might believe that the reports are similar on the maintenance dimension but different on the weather dimension. Thus, in this case a unidimensional similarity measure does not meet the analyst's information needs.

Figure 9:
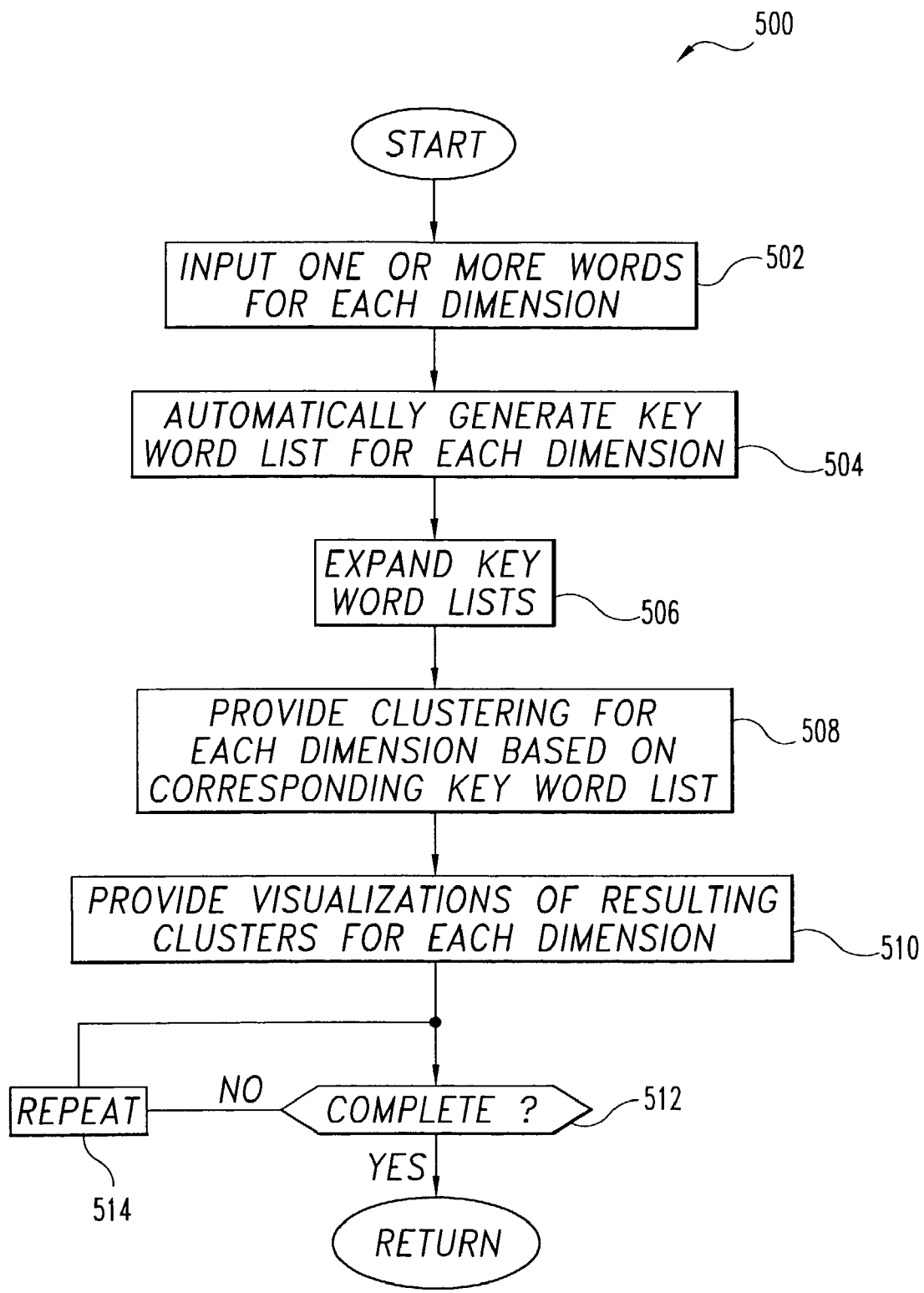
FIG. 9 is a flowchart illustrating details of a multidimensional clustering procedure that can be performed as part of the routine of FIG. 2.

Referring to the flowchart of FIG. 9, multiple dimension clustering procedure 500 performs clustering with respect to several different dimensions of a given set of documents. These different dimensions can be obtained relative to alternative documents signatures, different facets or subsets of the concept document representation, from user input, a combination of these, or from such different sources as would occur to one skilled in the art. In stage 502, a user or other source provides one or more words describing each dimension of interest (such as term combinations corresponding to selected concept nodes of the previously described document representation). There words are further characterized for each dimension with key words or phrases and/or a key word list automatically derived therefrom in stage 504. The key word lists are expanded in stage 506 using synonym detection and/or word association methods such as those described hereinafter. Alternatively, user supplied terms can be used in the supervised facet identification procedure described earlier, and clustering preformed separately on each identified facet.

From stage 506, procedure 500 continues in stage 508 which executes a separate cluster analysis for each dimension. Such clustering can be performed using key words only; using all words with more weight given to the keywords; using words uniquely associated with different subsets or facets of the representation for each dimension; and/or in combination with document comparison based on machine and/or human expert input in the manner previously described. The document comparison approach also allows for a "residual" cluster analysis to detect group structure not described by the predefined dimensions.

Procedure 500 continues with stage 510. In stage 510 a visualization is provided of the clustering results for each different dimension. The visualizations can be linked, so that selected documents are highlighted on all displays. This allows the analyst to study the interactions and correlations between different dimensions. Each combination of clusters from different dimensions provides a response pattern. (For example if there are five dimensions each with two clusters then there are $2^5=32$ unique response patterns.) A consensus clustering method can be used to obtain a superclustering of the response patterns, and/or the structure of a corresponding concept/document representation imposed to provide linkage between clustered dimensions. The superclusters can be highlighted and linked across multiple displays. The result is a set of visualizations where clustering is based on user needs, with much simpler user input requirements than previous methods. From stage 510, procedure 500 continues with conditional 512 to test whether the clustering is procedure is complete. If not, procedure 500 can repeat entirely or selected portions can be repeated as desired in stage 514 with any desired modifications provided automatically and/or through user input. If the test of conditional 512 is positive, then procedure 500 halts, returning to a calling routine.

Additionally or alternatively, the analyst's domain knowledge (i.e., knowledge of dimensions of domain) can be incorporated into the clustering. For this option, the partially supervised similarity comparison technique can be modified to compare pairs of documents on each of several dimensions, so that two documents can be similar on one dimension but dissimilar on another. The cluster analysis and display is modified based on this user feedback.

Yet another application is directed to automatic document summarization. The goal of an automatic summarizer is to extract information from an information source, extract content from it, and present the most important content to the user in a condensed form and in a manner sensitive to the user's or application's needs. Automatic summarization is directed to condensing what a document is about. Such "aboutness" is also frequently the target of information retrieval and text mining systems. In web search engines, information retrieval and text mining methods might be used to identify relevant documents (possibly hundreds of them), but automatic summarization methods are required to provide concise summaries of these documents or groups of documents.

A frequent shortcoming of existing summarization systems is the failure to distinguish between different types of information, 1.e., that information can often be compared and summarized in different 'respects.' In one summarizer application, individual document summaries can be extracted based on training data in the form of text/summary pairs, where such training summaries were written by professionals, sometimes in the form of an abstract. For example, in the ASRS database aviation safety analysts typically write a 1–2 sentence synopsis for each report. From the training data, the goal is to 'learn' characteristics of a good sentence extractor. One approach utilizes multivariate reduced-rank regression described as follows. Let X be the N×T document-term matrix for the training documents, and let Y be the N×T document-term matrix for the training summaries. Then we seek an orthogonal matrix Q with rank R<T that minimizes $\|Y-XQ\|$. Given a new document vector x from which to extract a summary, compute the 'predicted' summary $\tilde{y}=Qx$, and identify the sentence s in the document that is most similar to $\tilde{y}$. If sparseness of X and Y is exploited and non-negativity constraints imposed on Q, then Q typically will be sparse also, simplifying the comparison between s and $\tilde{y}$. Alternatively, the matrices X and Y can be concept vectors obtained by flattening a hierarchical document representation prior to the determination of Q. Alternatively or additionally, the construction of the document representation might be modified to minimize the difference between vectors x and y.

It is possible that the optimal regression matrix Q is dependent on the context or other external information about the document (e.g., metadata); i.e., Q=Q(context). If context can be captured as covariates in a covariate vector u, then the effect of context can be captured explicitly in Q(u). The accuracy of the parameter estimates is a function of number of parameters that need to be estimated and the number of documents containing the context. In most practical settings, because of data limitations the parameters associated with u need to be estimated using a reduced-order loglinear model (typically first or second order). Alternatively, context or other external information can inform the construction of hierarchical document representation, as described earlier.

Typically, summaries are desired that include several different 'dimensions' of interest. For example, in aviation safety, dimensions might be 'accident description' (what happened) and 'accident cause' (why did it happen); or we might be interested in the dimensions weather, mechanical problems, and communications problems. There are multiple topics within each dimension. One existing scheme addresses the "different dimensions of relevance" by classifying sentences to one (or none) of seven pre-defined 'types'. This classifier was constructed using a large number of annotated sentences (where each received a code from {0,1, . . . ,7} depending on its 'type'). Alternatively, summarization is conducted separately for each facet identified by a facet identification procedure, with or without supervision.

In the absent of annotated sentences, separately extracted sentences related to different dimensions of a document can be based on overall annotation of the document based on a document signature of stage 140 and/or the concept/document representation. Two such dimensions might be the cause and the consequence of an aviation safety incident. Further, with external variables $u_1$ and $u_2$ that provide codes (category levels) for the cause and consequence (as perhaps determined with the representation), the problem can be approached with multivariate redundancy analysis; where mathematically the problem is to identify functions $f_1(u_1)=Q_1x$ and $f_2(u_2)=Q_2x$ that predict the cause and consequence codes, respectively, subject to the constraint that the two functions are orthogonal. The result is to identify causal features that are distinct from consequence features, and vice versa. Metadata-based summaries are extensions of cluster summaries. Such clustering can be performed in accordance with the signature-based approaches described above. Extract-based cluster summaries can be derived via a score function h(u;x) where u is a categorical variable describing cluster membership.

A further application is determination and representation of events indicated by documents. This technology has numerous potential applications. In one embodiment directed to news monitoring, it is desired to automatically detect new events among the 200 or more news stories produced by the news services every day. Typically most of the stories will not be about new events. Accordingly, one approach is to identify those few stories that are truly about something new. In another approach, an automated summary of the day's events could be generated. Retrospectively, a summary of the major events over some time period might be desired. Another potential area of application is in competitive intelligence, where the goal is to monitor trends and significant changes in competitors' activities. Potential sources of data are patent abstracts and trade magazines.

The following features of events indicated by documents have been found: (a) events are characterized by a sharp change in term frequency distributions over time; (b) documents about the same event tend to be clumped in time; (c) coverage of most events is usually short-lived with more significant events receiving more extended coverage; and related documents that appear in two different time clumps tend to be about different events (though the events may be related).

In one news-based example, documents for event detection analysis are stories form the Associated Press newswire. In the newswire data, a natural time unit is day, because over 200 stories are produced each day. In other document collections, there may be time gaps of varying lengths between successive documents, so a moving window with a fixed number of documents might be used instead. For event detection, interest typically lies in those patterns that differ from randomly generated patterns. Indeed, a human observer can mistake a random pattern for one of significance as well as fail to recognize a significant pattern due to random noise. Accordingly, statistical evaluation can be used to assist in detecting events. It can be shown using statistical methods that certain patterns differ significantly from random. As a result, it is likely the terms of the patterns are associated with deviations from random in the presence of noise.

Figure 10:
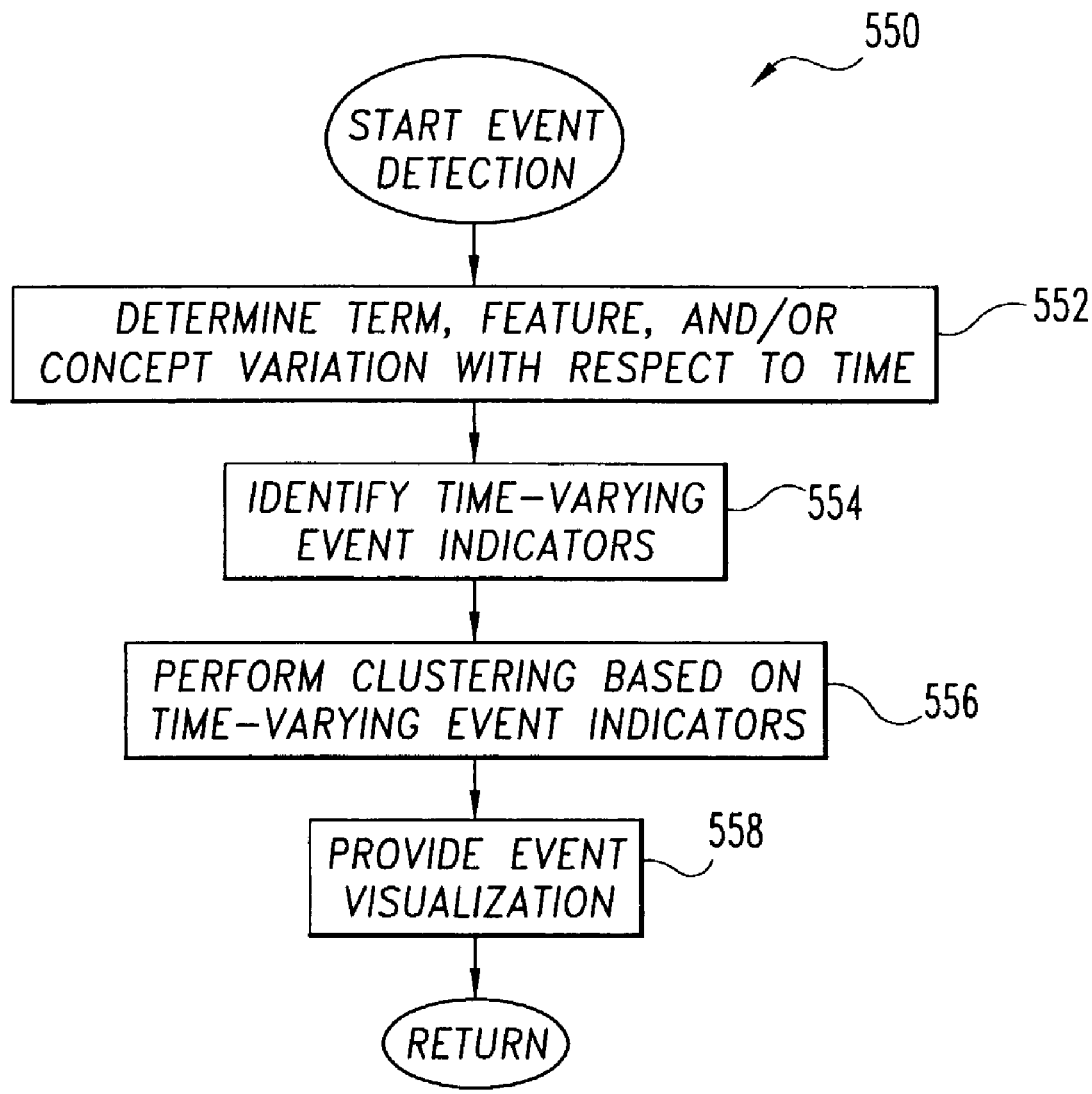
FIG. 10 is a flowchart illustrating details of an event detection and visualization procedure that can be performed as part of the routine of FIG. 2.

Referring to the flowchart of FIG. 10, event detection procedure 550 is illustrated. Procedure 550 begins in stage 552 with the determination of variation of a document feature, such as a concept or term, with respect to time. Identifying events often involves detecting change of a latent property, such as a concept relating to the content or topic of a document. Such concepts could be considered in stage 552 as determined from document signatures determined in stage 140. Alternatively or additionally, an explicit feature, such as selected document terms, could be identified for consideration in stage 552. For example, terms could be identified with distributions that change over time in a manner more significant than that expected at random. Over a given time period, we can characterize a term by its total number of occurrences (term frequency) over a group of documents or by the number of documents containing the term (document frequency). Indeed, term frequency and/or document frequency can be utilized.

Considering document frequency distribution further with respect to time $t_0$ for the Associated Press dataset of more than 200 documents per day, to might be a given day. In other datasets, where documents are more spread out in time, $t_0$ might be a moving window with a width dependent upon the relative sparcity of the term of interest. Let $t_1$ denote the baseline time period, the period to which $t_0$ will be compared, and let w denote the term of interest; then the document frequency distributions for both time periods are given by the 2×2 contingency table displayed in Table IV as follows:

TABLE IV

|   | w | ~w |
|---|---|---|
| $t_0$ | $n_{00}$ | $n_{01}$ |
| $t_1$ | $n_{10}$ | $n_{11}$ |

In Table III, $n_{00}$ is the number of documents that include term w during period $t_0$, $n_{01}$ is the number of documents that do not include term w during period $t_0$, $n_{10}$ is the number of documents that include term w during period $t_1$, and $n_{11}$ is the number of documents that do not include w during period $t_1$.

Procedure 550 proceeds from stage 552 to stage 554 to determine if a feature is indicative of an event. To test for a significant deviation from the baseline period in a manner that could suggest an event, one or more of several techniques have been found to be of benefit, including: (a) Pearson's $X^2$ for independence; (b) Fisher's exact test for independence; (c) the likelihood ratio test for independent binomial proportions; (d) the mutual information measure; and (e) scan statistics.

All of these measures produce a surprise value for each term at each time period, and a run length for each term at those time periods where the term is considered significant (this is assessed by comparing a test statistic to a reference distribution). The run length is the number of consecutive days that the term is significant. Significant or "eventful" terms can be arranged into event classes using cluster analysis. The relative significance of a given event can be based on the surprise values and run length of its terms.

In certain implementations, the scan statistics technique has been found to be of surprising desirability in identifying terms indicative of events. Generally, the scan statistic approach automatically corrects for multiple comparisons, typically producing fewer questionable indications than other methods. For each term of interest, the scan statistic technique includes moving a window through the entire document corpus in increments and counting the number of documents containing the subject term in each window. The test statistic, known as the scan statistic, is the largest count over all windows. A surprise value is obtained by comparing the scan statistic to a reference distribution (the surprise value is a function of the scan statistic and the number of documents containing the term). This process is repeated, successively removing events after they have been identified and applying the procedure to the remaining corpus until the scan statistic is no longer significant. For more general background information on this technique see Glaz and Balakrishnan, *Scan Statistics and Applications*, published by Birkhauser, (1999).

As described in Katz, "Distribution of Content Words and Phrases in Text and Language Modeling", *Natural Language Engineering*, volume 2, pp. 15–59, it has been determined that multiple occurrences of a term contribute more to the content of a document, but often in a logarithmic, and not in a linear, manner. Further, if a term occurs only once in a document, it probably does not contribute at all to the document's content. These findings suggest the following as a measure of the content carried by a term during some time period where $f_i$ is the frequency of the term in document i:

$c_i=0$ if $f_i<2$ $c_i=\log(f_i)$ if $f_i>1$ then the term's measure of content is:

$$C = \sum_{i=i}^{n} c_i.$$

It should be understood that change detection techniques, such as those described above, can be applied to this measure.

In stage 556 of procedure 550, clustering of all the documents in the selected set is performed. In one example, clustering of stage 554 could be performed on document signatures provided from stage 140. Another example of a clustering technique is described as follows in the context of a model-based clustering method for binary data—known as a latent class model—applied to a binary document-by-term matrix. Let $x_{ih}=1$ if document h contains term i, and let $x_{ih}=0$ otherwise. Let $x_h=(x_{1h}, x_{2h}, \ldots, x_{Th})'$ denote the vector of T binary responses for document h. Then the latent class clustering model for documents is given by the following equation:

$$f(x_h) = \sum_{k=1}^{K} \eta_k \prod_{i=1}^{T} \pi_{ik}^{x_{ih}} (1-\pi_{ik})^{1-x_{ih}}, \sum_{k=1}^{K} \eta_k = 1, h=1,\ldots,N$$

The parameter $\eta_k$ is called a mixing parameter; it gives the relative size of cluster k. The parameter $\pi_{ik}$ is called a conditional response probability; it is the probability that a document from cluster k contains term i. These parameters—as well as the parameter K, the number of groups—are estimated by the clustering algorithm. Information-theoretic measures, such as the Bayesian Information Criterion (BIC), can be used to assist in the selection of K. To estimate $\eta_k$ and $\pi_{ik}$, an Expectation-Maximization (EM) algorithm can be used. To obtain a solution with the EM algorithm, alternatively update: (a) the posterior probability that document h belongs to cluster k (for h=1, . . . N; k= 1, . . . , K), given data and current parameter estimates of the following equation:

$$h(k \mid x_h) = z_{kh} = \frac{\eta_k \prod_{i=1}^{T} \pi_{ik}^{x_{ih}} (1-\pi_{ik})^{1-x_{ih}}}{\sum_{l=1}^{K} \eta_l \prod_{i=1}^{T} \pi_{il}^{x_{ih}} (1-\pi)^{1-x_{ih}}},$$

and (b) the estimates of $\eta_k$ and $\pi_{ik}$ given current posterior probability estimates of the following equation:

$$\hat{\eta}_k = \frac{1}{N}\sum_{h=1}^{N} z_{kh}, \hat{\pi}_{ik} = \frac{\sum_{h=1}^{N} z_{kh} x_{ih}}{\sum_{h=1}^{N} z_{kh}}$$

Following convergence of this iterative algorithm, each document is assigned to the cluster for which it has the largest posterior probability. The latent class clustering model represents one of many possible ways to detect events by grouping documents as opposed to frequency of features across the documents. In other embodiments, the clustering approach can be modified for other types of feature vectors, such as those based on frequencies or continuous variables.

As part of stage 556, it has been found that it is often desirable to account for features that change abruptly in time, such as those concepts or terms discovered in stage 554. In one form, time-varying features identified in stage 554 are used to modify the document clustering. For the latent class clustering example previously described in connection with stage 556, each term i is one of several time-varying terms identified in connection with stage 554. In another form, terms i are weighted in the clustering technique according to their surprise values. In one approach, $w_i^{max}$ is taken to be the maximum surprise value for term i over all time periods. Then, in computing the posterior cluster probability for document h, term i receives weight $w_i^{max}$. That is, time-varying features have more influence on the classification of a document than features that do not vary in time. In the numerator of the equation below, weights are applied to the logarithm as follows:

$$\log \eta_k + \sum_{i=1}^{T} w_i^{\max}[(x_{ih}\log \pi_{ik} + (1-x_{ih})\log(1-\pi_{ik}))].$$

They are similarly applied in the denominator of this equation. In another approach, weights are applied only at times when the feature is surprising, in which the following equation applies:

$$d_{kh}^2 = \frac{\sum_{i=1}^{T} w_i^{\max}(x_{ih} - \mu_{ik})^2}{\sum_{i=1}^{T} w_i^{\max}}$$

where $w_{ih}$ is the surprise value for term i at the time that document h was created. By applying this differential feature weighting, a prior opinion about the possible events for document h is being imposed.

In another embodiment of the present invention, the clustering model is modified for event detection as follows. Let $z_{kh}$ be the cluster indicator for document h and cluster k, so that $z_{kh}=1$ if document h belongs to cluster k. Then take the prior probability that $z_{kh}=1$ to be a function of cluster assignments of documents observed during the same time period. That is, if during time t a disproportionate number of documents are assigned to cluster 1 then the prior probability (that is, prior to observing a feature vector) that an arbitrary document chosen from the same time period will be more likely to belong to cluster 1. Mathematically, we express this prior probability by the following equation:

$$\log \eta_k + \sum_{i=1}^{T} w_{ih}[(x_{ih}\log \pi_{ik} + (1-x_{ih})\log(1-\pi_{ik}))].$$

where $u_{hk}$ is the proportion of documents observed in the same time period as document h that belong to cluster k. Additionally or alternatively, in other embodiments, change detection algorithms of the type discussed in connection with stage 554 can be applied to the clustering solution to identify clusters associated with events as previously described. Moreover, any combination of these forms, approaches, and/or embodiments can be used as would occur to one skilled in the art.

Another embodiment of the present invention exploits the hierarchical concept structure and document representation described earlier. In one implementation, the hierarchical concept structure is constructed on a training set of related documents. The concept structure remains fixed for the remainder of the analysis, i.e., it is not modified. As new documents arrive, they are mapped to the concept hierarchy. The statistical measures of surprise are applied to concepts identified in the documents. In one implementation, surprise measures are first measured for higher order concepts, which will be more prevalent than lower order concepts, and thus more easily detectable. Subsequent surprise measures are computed for the next level concepts that are descendents of at least one high level concept.

Figure 11:
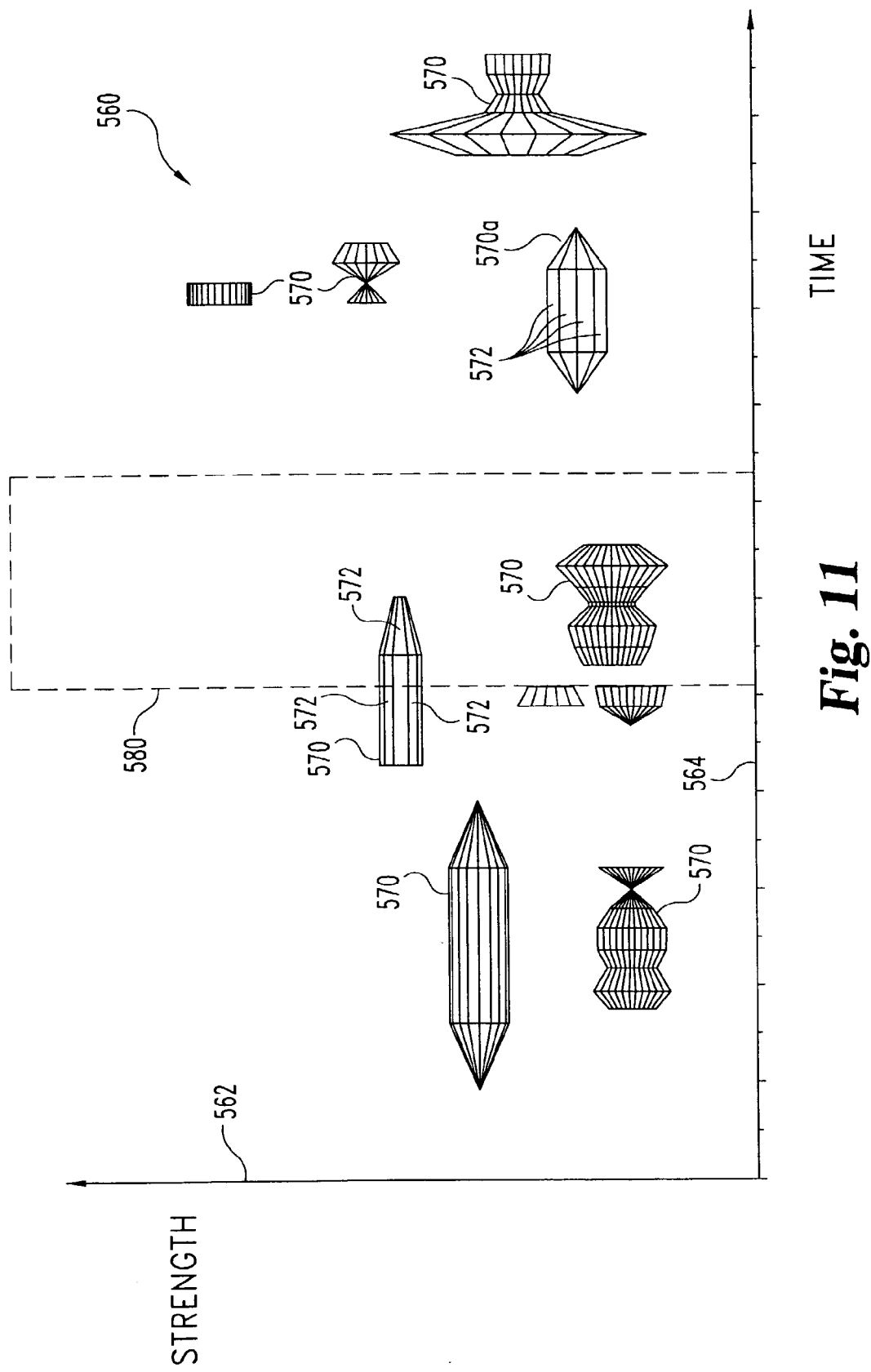
FIG. 11 is a visualization of events detected in accordance with the procedure of FIG. 10.

From stage 556, procedure 550 proceeds to stage 558 to provide a visualization of the events. FIG. 11 provides visualization 560 of a number of events that may be identified through stages 552–558 and/or utilizing other event detection techniques. Visualization 560 includes a vertical axis 562 and horizontal axis 564. Horizontal axis 564 corresponds to time, with each vertical hash mark representing a consecutive time interval, such as an hour, a day, a week, etc. as they proceed from left to right. A number of visualization objects 570 are also illustrated in the form of polygon shaped areas with a closed outer boundary 571. Each object 570 represents an event. The left side position of each object 570 along axis 564 indicates when the represented event began and the right side position of each object along axis 564 indicates when the represented event ended. Correspondingly, the distance between the beginning and end indicates the duration of the represented event.

The extent of each of objects 570 along axis 562 is indicative of the relative strength of the event based on the metric(s) used to determine such event. As illustrated in FIG. 10, each object 570 is comprised of vertical sequence or "stack" of components 572 corresponding to the represented event. Only a few of component 572 are designated by reference numerals to preserve clarity. In one embodiment, components 572 each represent a different word, concept, topic, or other feature used in determining such event. The extent of one of components 572 along axis 562 is indicative of the contribution of that component 572 relative to the other components 572 comprising a given object 570. Alternatively or additionally, fill patterns, colors, and/or another type of indicator capable of distinguishing different components 572 of a given one of objects 570 could be utilized, but are not shown to preserve clarity. Only a few of objects 570 and components 572 are designated by reference numerals in FIG. 11 to preserve clarity.

Figure 12:
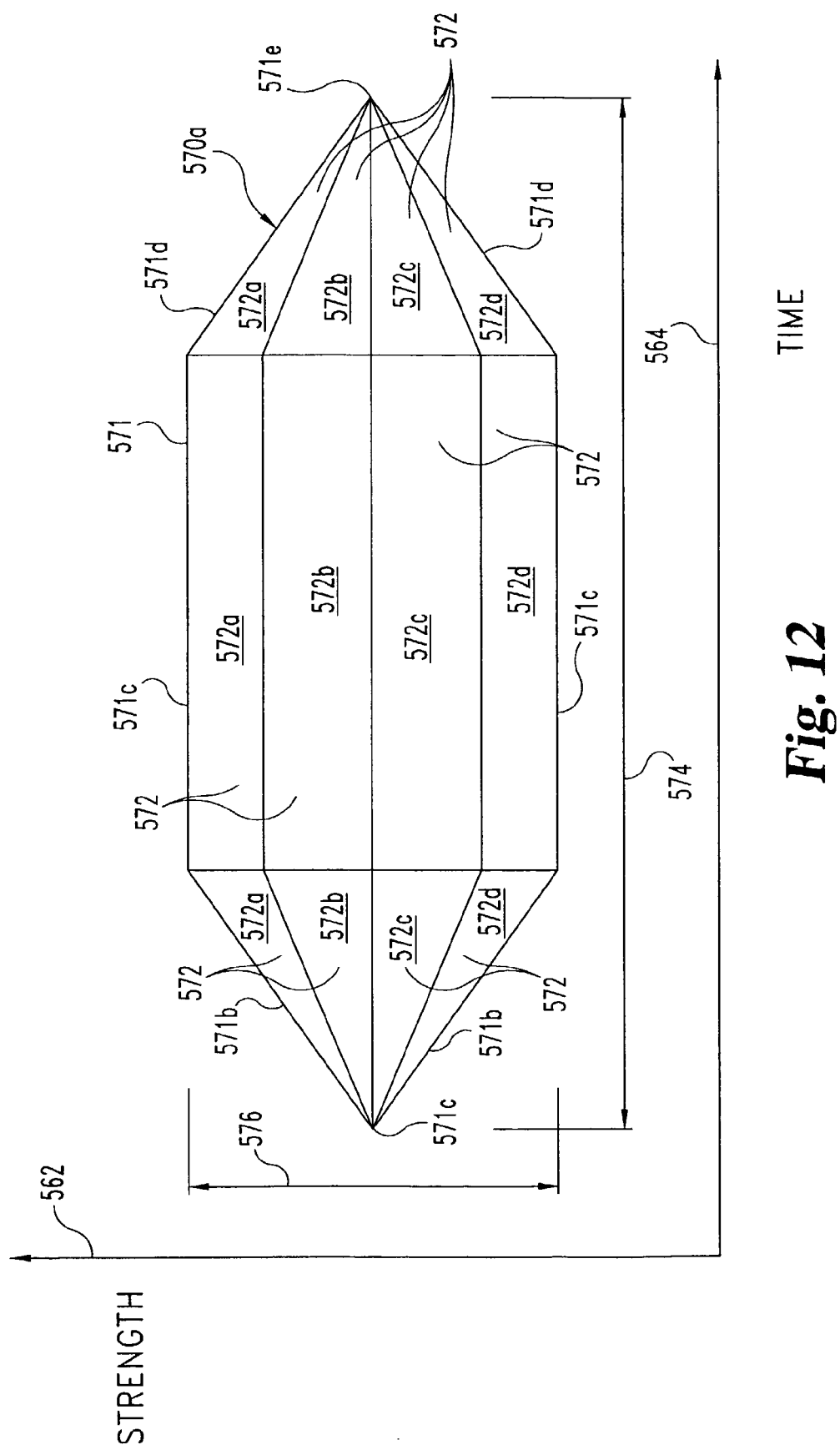
FIG. 12 is a diagram of a visualization object from the visualization of FIG. 10 showing greater detail.

To further enhance understanding, FIG. 12 shows a representative one of objects 570 in greater detail that is more specifically labeled object 570a. Object 570a includes outer boundary 571 comprised of onset point 571a, opposed diverging segments 571b, opposed parallel segments 571c, opposed converging segments 571d, and termination point 571e. Horizontal segment 574 extending from point 571a to point 571e corresponds to duration of the event represented by object 570a, and vertical segment 576 represents the maximum or peak strength of the event represented by object 570a. It should be appreciated that object 570a is generally symmetric about a horizontal line in this embodiment.

As time progresses from left to right, diverging segments 571b represent an increase in relative strength of the represented event from point 571a to parallel segments 571c. Parallel segments 571c represent a period of an event strength that is generally unchanging, and at its peak correspondingly to segment 576. Converging segments 571d at the leftmost extreme correspond to the peak event strength level of vertical segment 576, which then decreases with the progression of time toward point 571e. It should be appreciated from a brief review of FIG. 11, that other objects 570 can be various shaped. For example, onset and/or termination points can be included in vertical line segments that correspond to the start and stop times of the visual object-represented event. In another example, diverging, converging, and/or parallel opposing line segments may be of a different number or absent. In still other examples, objects may not be symmetric about a horizontal line, indicating changes in strength by changing slope of boundary line segments on only one side, and/or providing a strength indication independent of boundary line shape. Such a strength indicator could be provided by alphanumeric text or other symbols; a static, flashing or changing color; animation; different line patterns; and/or different fill patterns, just to name a few. In still other embodiments, a strength indication may be optional or absent. Indeed, strength and/or time can be represented in different ways than by orthogonal axes.

Object 570a is comprised of components 572 more specifically labeled 572a, 572b, 572c, 572d. For an example based on news stories from the Associated Press newswire, components 572a, 572b, 572c, and 572d might correspond to topic words "kuwait-iraq-iraqi-hussein" indicative of the event represented by object 570a—the invasion of Kuwait by Iraq. The shapes of components 572a, 572b, 572c, 572d change with and compliment the shape of the corresponding boundary 571.

Visualization 560 is interactive, allowing the user to display or hide labels for events, corresponding features, dates, etc. A windowing feature 580 is schematically illustrated in phantom that can be arranged to highlight selected time intervals, including a drill-down capability to show labels, features, such as topic/concept descriptions for selected objects 570, and the like. Visualization 560 can be provided with standard Graphic User Interfacing (GUI) techniques, by hardcopy printing, and and/or through different visualization approaches as would occur to one skilled in the art.

Still another application relates to interactive discovery of relationships between terms (i.e., words) in a collection of documents. Such terms could be those selected in connection with the document signature generation and/or concept representation techniques previously described. Typically, there are many different ways that words can be related. By allowing operator input via input devices 24 of system 20, a user can define the type of relationship, and then find works in the corpus that have this relationship. Relationship discovery can be based on statistical cooccurrence patterns of the terms, such that if they are nearby one another in "context space" they are considered to be similar. Operator input can be used to transform the context space to discover different ways terms might be related.

Figure 13:
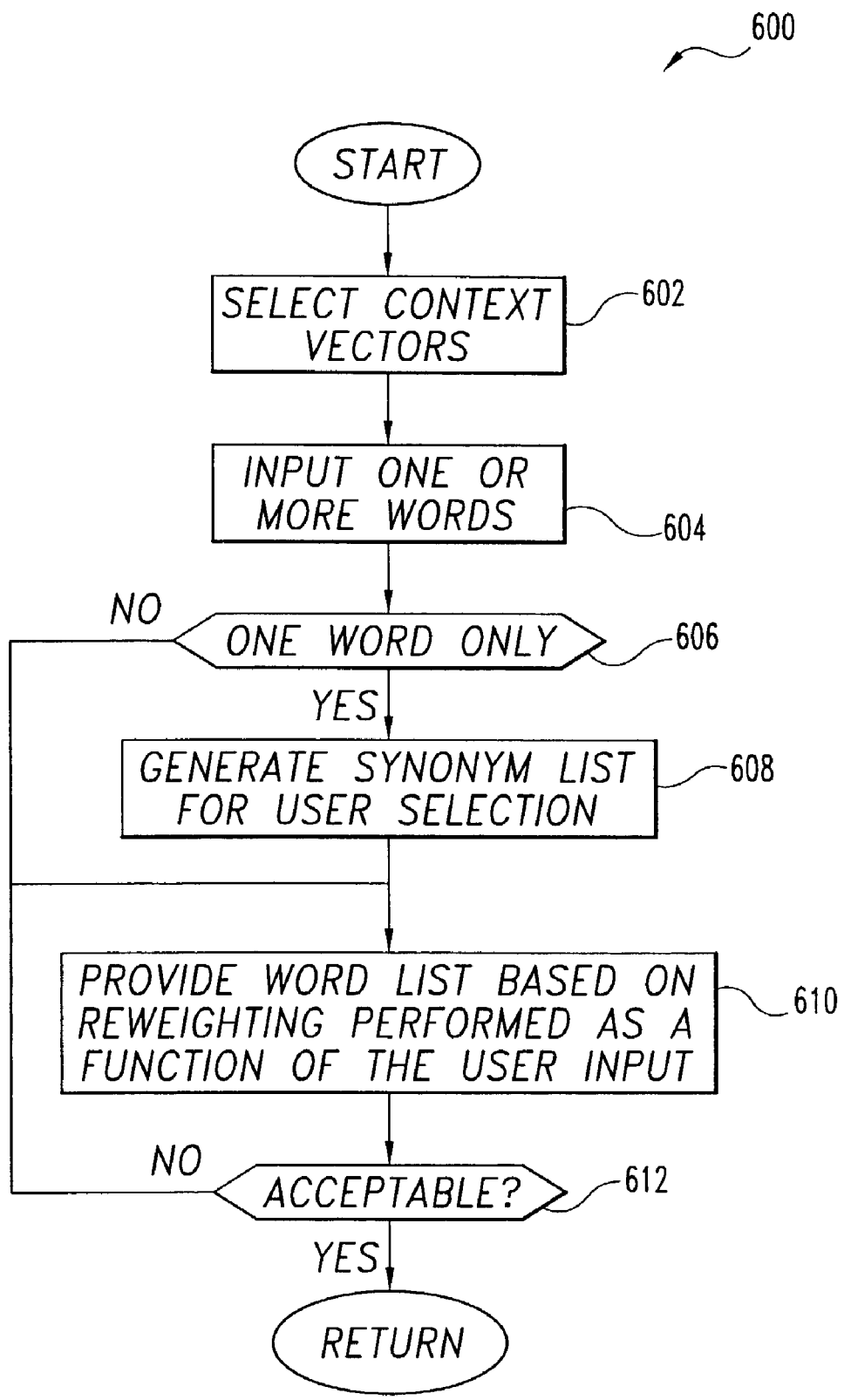
FIG. 13 is a flowchart illustrating details of a procedure for identifying term relationships.

The flowchart of FIG. 13 depicts interactive relationship discovery procedure 600 of another embodiment of the present invention. In stage 602, context vectors for relationship analysis are selected. These can be provided as application-specific document signatures from stage 140 and/or derived from previously described routines, procedures, or stages. Alternatively or additionally, context vectors can be generated through statistical cooccurrence measures, cooccurrence measures combined with natural language processing techniques, and/or through such different techniques as would occur to one skilled in the art.

Procedure 600 continues with stage 604 in which the user inputs one word of interest or multiple words that are related in some manner determined by the user. At the onset, the user may have a vaguely defined goal, such as to find "synonyms" of a given word. After viewing an initial list of "synonyms" provided in response, the user might refine the goal, either by selecting those words on the list that have an interesting relationship with the original word, or by rejecting all words on the list and inputting examples of "related terms." Alternatively, the user might have a clearly defined goal—such as identifying all company names in the corpus—but might only have one example of a company name. From stage 604, conditional 606 tests whether only one word was input. If the test if positive, procedure 600 continues in stage 608 to automatically output words with context vectors most similar to the input word, and the user designates those output words that are related to the input word. The resulting related word set is submitted for processing in stage 610. Likewise, if the test of conditional 606 is negative then there are already two or more related words available for processing in stage 610, so procedure 600 bypasses stage 608, proceeding directly to stage 610. In stage 610, all context vectors are reweighted so that similar words—as defined by the user—have similar context vectors. A new list of related words based on the reweighted context vectors is provided for the user's approval. The reweighting scheme can put more weight on the covarying terms that unite the similar terms (i.e., those words that help define the sense of the term relations). This reweighting of the context vectors transforms from one context space to another. From stage 610, conditional 612 is encountered which tests whether the context space as presented with the current related word list is acceptable to the user. If it is acceptable, procedure 600 returns from the affirmative branch of conditional 612. If it is not acceptable, procedure 600 loops-back from the negative branch of conditional 612 to stage 610. Stage 610 and conditional 612 are repetitively executed in this manner until conditional 612 is satisfied.

In one form, reweighting of the context vectors in stage 610 is based on an initial set of context vectors $X_1, \ldots, X_T$, where $X_i = (X_{1i}, \ldots, X_{pi})'$ is the p-dimensional context vector for the term i and there are T terms. Dimension reduction tools can be applied in the creation of context vectors, so p will usually be smaller than T. Let Sim $(X_i, X_j)$ denote the similarity between context vectors for words i and j. The cosine measure of similarity is given by the following equation:

$$Sim(X_i, X_j) = Cos(X_i, X_j) = (\Sigma_h X_{hi} X_{hj})/(\|X_i\| \|X_j\|),$$

Where $\|X_i\| \Sigma_h X_{hi}^2)^{1/2}$ is the length of context vector $X_i$. $Cos(X_i, X_j)$ denotes the cosine of the angle between the vectors $X_i$ and $X_j$. It takes values between -1 and 1, where values close to 1 suggest that the vectors are "similar". For notational convenience, suppose the first r words, $\{1, 2, \ldots, r\}$, with context vectors $X_i, \ldots, X_r$, are chosen by the user to be related. It is very possible that these r context vectors are not tightly clustered in T-dimensional space. For example, $X_i$ may be more similar to context vectors of non-related words than to context vectors of related words. Assume that related words have common covarying patterns with at least some of the features in the context vectors, while possibly having very dissimilar covarying patterns with other features. Then, discover common patterns shared by these context vectors and find additional context vectors (and hence additional words) with similar patterns. The features that contribute to these common patterns are given more weight (and hence more importance) in the subsequent reweighted cosine similarity computation of the following equation:

$$Sim^*(X_i, X_j) = Cos^*(X_i, X_j) = (\Sigma_h w_h X_{hi} X_{hi})/(\|X_i\|^* \|X_j\|^*),$$

Where $\|X_i\|^* = (\Sigma_h w_h X_{hi}^2)^{1/2}$, and $w_h$ is the weight, or importance, attributed to the $h^{th}$ feature.

In one example directed to this approach, suppose the user supplies the initial set of words: punt, pass, kick, apparently all words related to football. The context vectors of the words: punt, pass, and kick reveal that all three words cooccur frequently with the word football. Thus, other words that cooccur frequently with football, such as coach, touchdown, and quarterback, are supplied as additional related words. In more complex comparisons, the relations between words may not be fully described by one covarying term, making it more challenging to quantify the common patterns of related terms. To assist with extracting common patterns in context vectors, and assigning weights to features, the following aspects can be considered:

(a) if the $h^{th}$ element of the context vector has a large value for all related terms, then the $h^{th}$ element might be a key contributing term to the "common pattern of related terms;" where large positive values in context vectors imply a large cooccurrence value and small positive or negative values imply either no cooccurrence or a negative cooccurrence;

(b) a group of words is better defined by positive cooccurrences with other words than by negative cooccurrences with other words, because positive cooccurrences are, in general, less common than negative cooccurrences such that positive and negative cooccurrences can be considered positive and negative correlations (by way of nonlimiting example, the words: "punt," "pass," and "kick" might be negatively correlated with the word "computer;" however, many other words are negatively correlated with the word "computer" in contrast to the other words being positively correlated with the word "football;"

(c) the $h^{th}$ element of the context vector might have a large value for all related terms yet still not contribute to the characterization of a group of words if it also has large values for all (or most) unrelated terms, such that covarying terms are desired with relatively high values for related terms, and that have low variation among related terms relative to variation among unrelated terms;

(d) a single covarying term does not typically discriminate related terms from unrelated terms; and (e) if there are no common patterns among related terms, then the context vectors do not provide sufficient discriminatory evidence.

Based on these aspects, two embodiments to reweighting context vectors following user feedback have been developed: (a) one based on developing a profile of related terms and (b) another based on statistically discriminating related terms for other terms. For both of these embodiments, one computationally convenient approach to reweighting is to set all weights to zero for all but the most significant covarying terms.

One form of the profile-based reweighting embodiment is next described in further detail. For the case where the user supplies only one word, only covarying terms that are significantly positively correlated with the word of interest are retained, ignoring terms in a context vector comparison that do not cooccur or for which there is a negative cooccorrence. In the case of multiple user-provided seed words, this group of words is profiled by finding covarying terms that are positively correlated with all words in the group. One way to do this is to reward features that have large cooccurrence values with the related terms, and to reward features that have a small variance among the related terms. Thus, the ideal (and most heavily weighted) features are those with large means and small variances among the related terms. The weights $w_h$ take the form of the following equation:

$$W_h = f(\mu_{h,rel}/\sigma^2_{h,rel})$$

for some function $f$. A log function can be used, for example, to obtain weights; or for binary values of 0 or 1, an indicator function can be used that depends on a threshold. In practice $\mu_{h,\ rel}$ and $\sigma^2_{h,\ rel}$ can be estimated from the sample of relevant context vectors.

Another profile-based approach is to require that for features identified as being of significance, the values for all related terms exceed a predefined threshold. Those features which do not satisfy this criterion receive a weight of 0; those features that satisfy the criterion receive either a weight of 1 or a weight that is proportional to the extent that they exceed the threshold.

Yet another profile-based approach is to compute a mutual entropy measure for each feature, which is a measure of how well the feature discriminates between the related terms and all other terms. Large mutual entropy measures suggest that the feature is highly discriminatory. Weights are chosen as monotone functions of the mutual entropy measures.

One form of the statistical discrimination reweighting embodiment, includes statistically discriminating related terms for other terms. Based on this approach, one classification function is provided in according the following equation:

$$C(X) = \Sigma_h [\log(\sigma^2_{h,other}/\sigma^2_{h,rel}) + X_h - \mu_{h,other})^2/\sigma^2_{h,other} - (X_h - \mu_{h,rel})^2/\sigma^2_{h,rel}],$$

where X is the context vector for a candidate synonym term. Large values of C(X) suggest that the term is related. Candidate "synonyms" are ranked on the basis of C(X) (the higher of better). In this discrimination approach, reweighted cosine similarity measures need not be computed because the classification function provides a ranking of candidate synonyms. Estimates of $\mu_{h,\ rel}$; $\mu_{h,\ other}$; $\sigma^2_{h,\ rel}$; and $\sigma^2_{h,\ other}$ are input which can easily be obtained from the context vectors.

In another embodiment profile-based and/or statistically discriminant reweighting embodiments are both utilized. Alternatively or additionally, different reweighting approaches are used in still other embodiments. It should be understood that context vectors utilized for procedure 600 can be of any type and provided in any manner. Indeed, in one further embodiment, interactive discovery of term relationships according to procedure 600 is applied to several different types of context vectors and/or to a concatenation of several context vectors.

Accordingly, in at least one form of procedure 600 the user may interact to promote the discovery of term relationships by interatively refining the relationships of interest in addition to providing initial input; a user-controlled transformation of context space is provided; and/or different reweighting schemes associated with such transformation can be explored regardless of the context vector type(s) initially utilized.

Yet another application relates to the determination of multiple association groups based on topic terms, such as those used to describe concepts, themes, and/or other content-related features of documents. For the topic term example, it has been found that evaluating the distribution of a topic term over time can be misleading, or at least provide incomplete information. An examination of several topic terms in the Associated Press newswire corpus revealed that many occur in several different contexts over a period of months. It has been found these different contexts can be characterized as different context association groups by discovering the different contexts (alternatively considered "activities") of a topic term. By presenting these relationships over time, changes in a topic's activities or contexts can be observed. Correspondingly, association groups for several topic terms can be determined. For example, activities that two topic terms might have in common (at the same time or at different times) and activities that are unique to individual topic terms could be identified. These comparisons account for the heterogeneity of individual terms.

Numerous measures have been proposed for measuring the similarity between two terms, such as the matching coefficient, the Dice coefficient, the Jaccard coefficient, and the cosine similarity measure, to name just a few. These measurements correspond to the extent to which two terms cooccur in the same document or in the same neighborhood within documents. These measures are sometimes called first-order measures. Other measures are based on second-order cooccurrence that evaluates similarity of two terms based on whether they tend to cooccur with the same terms (though they don't necessarily cooccur with each other). Both first-order and second-order measures can provide misleading conclusions about term similarity if the terms are used in multiple contexts or activities. Two terms might be linked through an activity, but their similarity measure might be low because the two terms might have a high similarity measure yet be unrelated for a subset of the corpus.

As used herein, an "association group" means two or more terms that describe an event, activity, theme, or context. Further, association groups can be direct or indirect. Direct association groups are defined by first-order cooccurrence, so that two terms linked by an association group tend to cooccur in the same documents related to the association group. Indirect association groups are defined by second-order cooccurrence: two terms may be linked through an association group but do not necessarily cooccur in the same document. Linking terms by association groups is related to the determination of an intended meaning of a word that has multiple meanings—sometimes called word-sense disambiguation. Techniques directed to word disambiguation have been developed of both a supervised and unsupervised type. Schultze, "Automatic Word Sense Disambiguation," *Computational/Linguistics*, Vol. 24, pp. 97–123 (1998), is cited as a source of further background information concerning such techniques.

Recognizing documents can be "about" more than one topic, a document classification scheme can be arranged in which a given document can belong to multiple classes. In one embodiment, a binary document-by-term matrix is generated. Each resulting word group then represents a direct association group. To determine the contexts or association groups for a term of interest, the association classes containing the term are examined. Each document is assigned to one or more latent classes and each term of interest is also assigned to one or more latent classes. Because a document can belong to multiple classes, this combination of classes leads to a more complex organization than is typically obtained by clustering. For example, suppose there are three classes, defined relative to eight terms as shown in Table V as follows:

TABLE V

| Term | Class 1 | Class 2 | Class 3 |
|---|---|---|---|
| Earthquake | 1 | 0 | 0 |
| Rubble | 1 | 0 | 0 |
| Disaster | 1 | 0 | 0 |
| Natural | 1 | 0 | 0 |
| Hostage | 0 | 1 | 0 |

TABLE V-continued

| Term | Class 1 | Class 2 | Class 3 |
|---|---|---|---|
| Anderson | 0 | 1 | 0 |
| Iran | 1 | 1 | 1 |
| Shaw | 0 | 0 | 1 |

For this example, a document with class label 0,1,1 (class 2 and class 3, but not class 1) would be about Iranian hostages, and a document with class label 1,0,1 (class 1 and class 3, but not class 2) would be about an earthquake in Iran. Optionally, supervisory input can include defining the themes/classes by specifying which variables should belong to which classes.

For individual topic terms that are heterogeneous in their activities, viewing changes in the frequency of topic term usage may not be as useful as when it is understood how the term is being used for difference occurrences (e.g., different contexts). For example, in 1990 Gorbachev had dealings with many different agents in different contexts (e.g., Bush, at the summit; OPEC; soviet troops in Albania). The goal of a disambiguation algorithm is to uncover the different context in which the term is used. It is assumed that the user has a topic term or a group of topic terms for which there is a desired to explore further. A mixture model method has been developed to uncover the various activities a topic term is involved in. Visualized over time, events and trends involving the topic term can be identified.

A document-level ("global") multiterm disambiguation model for association grouping is provided by creating a feature vector for each document containing a key term. For example, let $X_h = (X_{1h}, X_{2h}, \ldots, X_{ph})'$ denote $h^{th}$ feature vector and $Z_h = (Z_{1h}, Z_{2h}, \ldots, Z_{rh})'$ be key term indicator vector $h^{th}$ feature, so that $Z_{jh} = 1$, if word $w_j$, is in document h. Then one disambiguation approach can be expressed as a clustering model as follows:

$$f(x_h \mid z_h) = \sum_{t=1}^{T} P(C_t, \mid z_h) g_t, (x_h \mid C_t),$$

where $C_t$ is context of $h$, $X_{ih} \amalg \mid C_t$, and $$P(C_t \mid z_h) \propto \exp(\alpha_t + B_t u_h), u_h = \begin{pmatrix} z_{1h} \\ z_{2h} \\ \vdots \\ z_{ih} z_{jh} \\ \vdots \end{pmatrix}$$

contains main effects and some interaction terms.

A local multiterm disambiguation model for association grouping is provided by creating a feature vector for each occurrence of each key term such that there may be several for a key term in one document. This feature vector is based on local context (neighboring words). By letting $X_h$ be $h^{th}$ with associated word $w_h$ and document $d_h$, then:

$$f(x_h \mid w_h, d_h) = \sum_{t=1}^{T} P(C_t \mid w_h, d_h), g_t(x_h \mid C_t),$$

where $P(C_t|w_h, d_h) \propto \exp(a + bw_h + cu_{th})$, $u_{th}$ = number of key words in $d_h$ classified to context $C_t$ For this approach, key words in same document are more likely to be used in same context.

Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only selected embodiments have been shown and described and that all changes, equivalents, and modifications that come within the spirit of the invention described herein or defined by the following claims are desired to be protected.

What is claimed is:

1. A method for text analysis, comprising:
   selecting a set of text documents;
   selecting a number of terms included in the set;
   establishing a multidimensional document space with a computer system as a function of the terms;
   performing a bump hunting procedure with the computer system to identify a number of document space features, the features each corresponding to a composition of two or more concepts of the documents; and
   deconvolving the features with the computer system to separately identify the concepts, wherein the concepts are stored in memory of the computer system.

2. The method of claim 1, which includes providing a concept representation corresponding to an acyclic graph with a number of nodes each corresponding to one of the concepts and different levels to represent related concepts of differing degrees of specificity.

3. The method of claim 2, which includes identifying a number of different multilevel groups in accordance with a mathematically determined degree of desired fit of the different multilevel groups.

4. The method of claim 1, which includes determining the multidimensional document space in accordance with frequency of each of the terms in each of the text documents.

5. The method of claim 1, which includes determining a plurality of different signature vectors from the concepts for different text processing applications.

6. The method of claim 1, wherein said deconvolving includes performing a latent variable analysis as a function of the features and the terms to identify the concepts.

7. The method of claim 6, wherein, said deconvolving includes:
   identifying one of a number of first level concepts of the text documents by determining each of the terms associated with one of the features; and
   establishing one of several second level concepts of the text documents by identifying at least one of the terms found in each member of a subset of the first level concepts.

8. The method of claim 7, which includes: providing a concept representation of the text documents, the representation including the first level concepts and the second level concepts with the subset of the first level concepts being subordinate to the one of the second level concepts;
   testing identifiability of the concept representation; and
   providing a modified concept representation in response to said testing if the concept representation is nonidentifiable.

9. A method for text analysis, comprising: performing a routine with a computer system, including:
   extracting terminological features from a set of text documents by executing a bump hunting procedure;
   establishing a representation of a number of concepts of the text documents as a function of the terminological features, the representation hierarchically indicating different degrees of specificity among related members of the concepts and corresponding to an acyclic graph organization;
   determining the representation is nonidentifiable;
   in response to said determining, constraining one or more processing parameters of the routine; and
   providing a modified concept representation after said constraining, the modified concept representation being identifiable and stored in memory of the computer system,
   wherein the concepts are determined by executing a deconvolution procedure with respect to the features.

10. The method of claim 9, wherein said constraining one or more processing parameters of the routine includes limiting the modified concept representation to a quantity of levels.

11. The method of claim 9, wherein said constraining one or more processing parameters of the routine includes limiting the modified concept representation to a strict hierarchy form in which each one of the concepts is subordinate to at most one other of the concepts.

12. The method of claim 9, wherein said constraining one or more processing parameters of the routine includes mapping the representation into a number of multilevel subgroupings each corresponding to an acyclic graph arrangement.

13. A method for text analysis, comprising: performing a routine with a computer system, including:
   extracting terminological features from a set of text documents by executing a bump hunting procedure;
   establishing a representation of a number of concepts of the text documents as a function of the terminological features, the representation hierarchically indicating different degrees of specificity among related ones of the concepts in correspondence to different levels of an acyclic graph organization;
   evaluating a selected document relative to the representation; and
   generating and storing in memory of the computer system a number of different document signatures for the selected document with the representation,
   wherein the concepts are determined by executing a deconvolution procedure with respect to the features.

14. The method of claim 13, which includes identifying several different group of related concepts, the groups each corresponding to several of the different levels of the representation.

15. The method of claim 14, wherein said generating includes preparing each of the different document signatures in accordance with a different one of the groups.

16. The method of claim 13, wherein said generating includes preparing each of the different documents signatures for a different text data processing application.

17. The method of claim 16, wherein the different text data application is one or more of the group consisting of event detection, document summarization, document clustering, document filtering, querying, and synonym analysis.

18. The method of claim 13, wherein:
said extracting includes determining the terminological features as a function of a set of terms contained in the set of text documents; and
said evaluating includes mapping the selected document to the concept representation as a function of any terms of the selected document contained in the set of terms.

19. A method for text analysis, comprising:
selecting a set of text documents;
representing the documents with a number of terms;
identifying a number of multiterm features of the text documents with a computer system as a function of frequency of each of the terms in each of the documents;
relating the multiterm features and the terms with one or more data structures corresponding to a sparse matrix with the computer system;
performing a latent variable analysis as a function of the terms to determine a number of concepts of the text documents from the one or more data structures with the computer system; and
providing and storing in memory of the computer system a concept representation corresponding to a multilevel acyclic graph organization in which each node of the graph corresponds to one of the concepts,
wherein the identifying is via a bump hunting procedure; and
wherein the latent variable analysis includes deconvolving the features to determine the concepts.

20. The method of claim 19, wherein the latent variable analysis includes:
identifying one of the concepts in a first level of the concept representation by determining each of the terms associated with one of the features; and
establishing one of the concepts in a second level of the concept representation by identifying at least one of the terms found in each member of a subset of the concepts in the first level.

21. The method of claim 20, wherein the concept representation indicates the one of the concepts in the first level is related and subordinate to the one of the concepts in the second level.

22. The method of claim 19, which includes:
determining a number of related subsets of the concepts, the subsets each spanning several levels of the concept representation and each corresponding to a different facet of the representation;
testing identifiability of the concept representation; and
providing several different document signatures from the concept representation.

* * * * *